United States Patent
Stallings et al.

(10) Patent No.: US 9,501,482 B2
(45) Date of Patent: Nov. 22, 2016

(54) DOWNLOAD QUEUE AS PART OF USER INTERFACE LIBRARY VIEW FOR ON-DEMAND CONTENT SYSTEMS AND METHODS

(75) Inventors: Heath Stallings, Colleyville, TX (US); Omar Abou-Khamis, Irving, TX (US); Andrien J. Wang, Keller, TX (US); Don G. Archer, Euless, TX (US); Nathan J. Maxfield, Wakefield, MA (US); Matthew R. Bruce, Frisco, TX (US); Jarrod S. Courtney, Sanger, TX (US); Michael S. Sanchez, The Colony, TX (US); Michelle Felt, Randolph, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 717 days.

(21) Appl. No.: 13/435,471

(22) Filed: Mar. 30, 2012

(65) Prior Publication Data
US 2013/0263012 A1 Oct. 3, 2013

(51) Int. Cl.
*G06F 3/01* (2006.01)
*G06F 15/16* (2006.01)
*G06F 17/30* (2006.01)

(52) U.S. Cl.
CPC .............. *G06F 17/30058* (2013.01)

(58) Field of Classification Search
CPC .................. G06F 3/01; G06F 15/16
USPC ........................................... 715/748
See application file for complete search history.

(56) References Cited

U.S. PATENT DOCUMENTS

| | | | |
|---|---|---|---|
| 2012/0278728 A1* | 11/2012 | Malin | H04N 21/47202 715/748 |
| 2013/0080968 A1* | 3/2013 | Hanson et al. | 715/783 |
| 2013/0205217 A1* | 8/2013 | Schuller | 715/739 |
| 2014/0006951 A1* | 1/2014 | Hunter | 715/719 |

OTHER PUBLICATIONS

Microsoft Computer Dictionary, 2002, Microsoft Press Redmond, Fifth Edition, pp. 13 and 175.*

* cited by examiner

*Primary Examiner* — Tadeese Hailu
*Assistant Examiner* — Darrin Hope

(57) ABSTRACT

An exemplary method includes an on-demand content management system detecting a user request for a content library view and displaying, in response to the request, the content library view in a graphical user interface, the content library view including a list of entries graphically representing a plurality of on-demand content instances included in a library of on-demand content, the list of entries comprising a first set of one or more entries representing one or more on-demand content instances included in the library and in a download queue and a second set of one or more entries representing one or more other on-demand content instances included in the library but not in the download queue, wherein a position of the first set of entries is prioritized over a position of the second set of entries in the list of entries. Corresponding methods and systems are also disclosed.

19 Claims, 17 Drawing Sheets

DOWNLOAD QUEUE AS PART OF USER INTERFACE LIBRARY VIEW FOR ON-DEMAND CONTENT SYSTEMS AND METHODS

BACKGROUND INFORMATION

As computing technologies have advanced, on-demand content has become more accessible to users of computing devices. For example, a person may utilize a personal computer, a set-top box, a smartphone, a tablet computer, and/or another appropriately configured computing device to access on-demand media content such as television programs, movies, music, and/or other forms of media content hosted by an on-demand media content service provider.

A variety of user interface tools have been developed to help users of computing devices interact with on-demand content services. For example, a user of a computing device may utilize one or more such user interface tools to find, access, and experience hosted, on-demand media content.

A common challenge for developers of such user interface tools has been to design and implement user interfaces that provide access to the tools and to an appropriate balance of information, usability, intuitiveness, control, and functionality that promotes a quality user experience. While technologies for on-demand content user interfaces have made significant advances in this regard, there remains room for improvement. For instance, there remains room to improve the intuitiveness, convenience, and/or usability of user interfaces designed to be used by a user of a computing device to find, access, experience, manage, and/or otherwise interact with on-demand media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary on-demand content systems and methods are disclosed herein. The exemplary systems and methods described herein may provide for distribution, access, and management of hosted, on-demand digital content. The systems and methods may further provide one or more user interfaces for use by a user of a content access device to find, access, experience, manage, and/or otherwise interact with on-demand content hosted and provided by an on-demand content service provider. For example, the exemplary systems and methods described herein may provide a user interface that includes a content library view having an on-demand content download queue integrated therein. Examples of content library views having content download queues integrated therein, as well as exemplary methods of providing such views are illustrated herein.

By providing a content library view having an on-demand content download queue integrated therein, such as described herein, the exemplary systems and methods disclosed herein may simultaneously provide a user of a content access device with information about both on-demand library content associated with the download queue and on-demand library content not associated with the download queue in a single, one-page integrated library view. In certain examples, the integrated library view may further provide options that may be selected by the user to initiate operations on the on-demand content represented in the library content view. Compared to conventional on-demand content user interfaces, the exemplary graphical user interface views such as the exemplary content library views described herein may provide improved intuitiveness, convenience, and/or usability in an on-demand content user interface.

Examples of on-demand content systems and methods, as well as examples of content library views, related graphical user interface views, and associated systems and methods will now be described in reference to the accompanying drawings.

Figure 1:
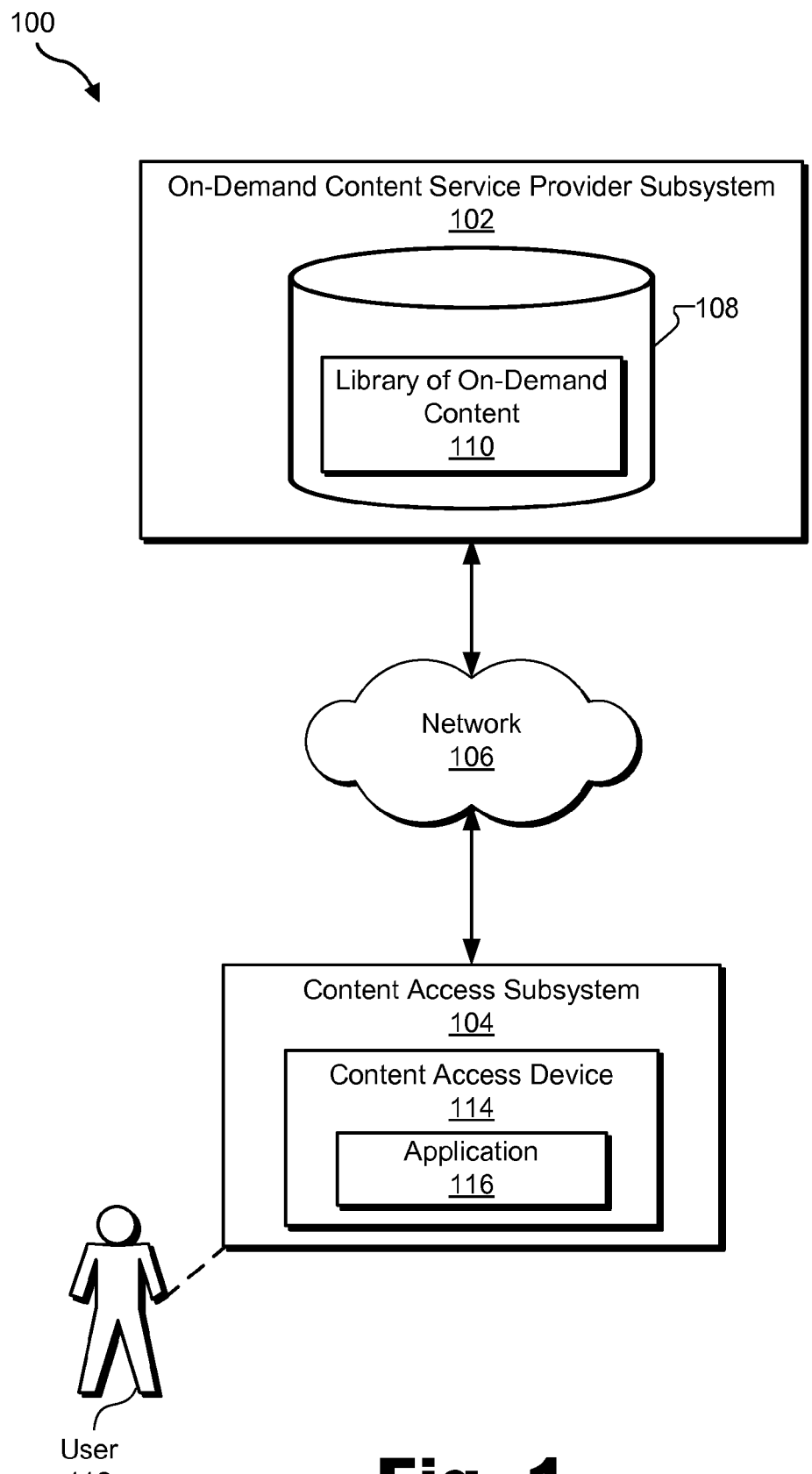
FIG. 1 illustrates an exemplary on-demand content system according to principles described herein.

FIG. 1 illustrates an on-demand content system 100 ("system 100"). As shown, system 100 may include an on-demand content service provider subsystem 102 ("provider subsystem 102") and a content access subsystem 104 ("access subsystem 104") in communication with one another by way of a network 106.

Provider subsystem 102 and access subsystem 104 may communicate using any suitable remote communications technologies, including any communications technologies capable of supporting distribution of digital content on demand by provider subsystem 102 to access subsystem 104. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1×EVDO"), radio frequency ("RF") signaling technologies, radio transmission technologies (e.g., One Times Radio Transmission Technology ("1× RTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, other suitable communications technologies, and/or any combination or sub-combination thereof.

Through these and/or any other suitable data communication technologies, provider subsystem 102 may distribute, and access subsystem 104 may access, digital content on demand by way of network 106. Network 106 may include any network or combination of networks provided by one or more appropriately configured network devices (and communication links thereto) and over which communications and data (e.g., content data and/or content metadata) may be transported between provider subsystem 102 and access subsystem 104. For example, network 106 may include, but is not limited to, a mobile phone network (e.g., a cellular phone network, a 3G network, a 4G network, etc.), a telecommunications network, the Internet, a wide area network, a local area network, any other network capable of transporting communications and data between provider subsystem 102 and access subsystem 104, and/or any combination or sub-combination thereof.

Data representative of on-demand digital content may be transported over network 106 in any way that physically transports a copy of the data between provider subsystem 102 and access subsystem 104. For example, a copy of on-demand content may be downloaded from provider subsystem 102 to access subsystem 104 for processing by access subsystem 104. A content download from provider subsystem 102 to access subsystem 104 may be persistent or non-persistent.

A persistent download includes a transfer of data representing on-demand content from provider subsystem 102 to access subsystem 104 in a manner that allows data representing the on-demand content to be received and persistently stored in local memory by access subsystem 104. In a persistent download of on-demand content, for example, a content instance is typically downloaded and stored in its entirety by access subsystem 104 before further processing (e.g., playback) may be performed by access subsystem 104 on the content instance. A persistent download of on-demand content to a content access device allows the locally stored data to be used when the device is offline to present the on-demand content for experiencing by a user of the device.

A non-persistent download includes a transfer of data representing on-demand content from provider subsystem 102 to access subsystem 104 in a manner in which the data is not persistently stored in local memory by access subsystem 104. In a non-persistent download of on-demand content, for example, a content instance may be streamed to and buffered by access subsystem 104 such that access subsystem 104 may perform further processing on the content instance (e.g., by playing back the content instance) during streaming of data representing the content instance from provider subsystem 102 to access subsystem 104.

As used herein, the term "on-demand content" refers to digitally represented content that is hosted and provided by provider subsystem 102 for on-demand access by access subsystem 104. On-demand content may include, without limitation, documents (e.g., word processing documents, image documents, spreadsheets, etc.), software applications, media content, and/or any other digitally represented content. As used herein, the term "on-demand content instance" or "content instance" may refer to a discrete instance of on-demand content, such as a particular document, software application, and/or media content instance (e.g., a particular photo, image, video, audio, multimedia, television program, movie, song, audio book, e-book, or any segment, component, or combination of these or other forms of media content).

On-demand content, as used herein, is distinguished from content that is not hosted and provided for on-demand access, such as content that is broadcast, multicast, or narrowcast in accordance with a provider-defined transmission schedule (e.g., a television programming schedule) rather than being provided on demand. Additionally or alternatively, on-demand content, as used herein, is distinguished from content that is transmitted linearly, such as television programming content that is broadcast, multicast, or narrowcast linearly in accordance with a provider-defined transmission schedule for access and processing (e.g., playback and/or recording) by a content access device. In system 100, transfer of data representing on-demand content from provider subsystem 102 to access subsystem 104 may be performed non-linearly (e.g., data packets may be received by access subsystem 104 out of sequential order), and access subsystem 104 may re-assemble non-linear data into an appropriate order for further processing by access subsystem 104.

On-demand content hosted by provider subsystem 102 may include content of various type classifications, and system 100 may be configured to process the various types of content similarly or differently. Examples of type classifications of on-demand content may include, without limitation, commercial on-demand content provided by one or more commercial content providers (e.g., commercial on-demand television programming content provided by a commercial television content producer) for on-demand distribution to consumers, personal on-demand content provided by end users of a hosted on-demand content service, and/or any other type of on-demand content. To illustrate, in some examples, commercial content may include rental content available for rental by a consumer, purchase content available for purchase by a consumer, and/or subscription content available to a subscriber on demand. Personal content may include a user's personal content that has been uploaded to and included in a personal data collection hosted by provider subsystem 102 for on-demand access by the user.

Provider subsystem 102 may host on-demand content for on-demand access. For example, provider subsystem 102 may store hosted, on-demand content in a content repository 108 that is included in and/or otherwise accessible to provider subsystem 102. On-demand content stored in content repository 108 may form a library of on-demand content 110. On-demand content included in library 110 may be referred to as "library content." Provider subsystem 102 may also maintain metadata for the library content, as well as data representative of user authorizations to access specific content instances and/or groups of content instances within the library content. In certain examples, the authorizations may be based on user subscriptions to a subscription television service (e.g., a subscription broadcast or multicast television service) such that provider subsystem 102 may provide access to on-demand content based on subscriptions of users to the subscription television service.

Provider subsystem 102 may include or be implemented by one or more server-side computing devices controlled by (e.g., operated by) one or more service providers such as one or more on-demand content hosting and distribution service providers. Provider subsystem 102 may interface with access subsystem 104 through communications over network 106. For example, provider subsystem 102 may receive a request for on-demand content from access subsystem 104 and respond by providing the requested on-demand content to access subsystem 104 on demand by way of network 106. As another example, provider subsystem 102 may receive, from access subsystem 104, a request for a user interface view and/or for certain data related to hosted, on-demand content (e.g., content metadata, content status data, etc.) to be used to generate a user interface view. Provider subsystem 102 may response by providing the requested data and/or user interface view for display by access subsystem 104 for viewing by a user of access subsystem 104.

Access subsystem 104 may interface with provider subsystem 102 through communications over network 106. For example, access subsystem 104 may provide a request for on-demand content to provider subsystem 102, receive the requested content from provider subsystem 102, and process the received content (e.g., by storing and/or presenting on-demand content received from provider subsystem 102).

Access subsystem 104 may be further configured to provide a user interface for use by a user 112 of access subsystem 104 to interact with access subsystem 104, on-demand content, and/or provider subsystem 102 (e.g., with a service provided by provider subsystem 102). For example, access subsystem 104 may be configured to provide one or more views and/or other tools in a graphical user interface ("GUI") and/or other user interface for use by user 112 to find, access, experience, manage, and/or otherwise interact with on-demand content hosted and provided by provider subsystem 102. Examples of GUI views that may be displayed by access subsystem 104 in a GUI on a display screen are described herein.

Access subsystem 104 may include or be implemented by one or more client-side computing devices controlled by (e.g., operated by) user 112, who may be an end user of one or more services provided by provider subsystem 102. FIG. 1 illustrates access subsystem 104 to include an exemplary client-side computing device in the form of a content access device 114. Content access device 114 may include, without limitation, a personal computer, a mobile phone, a smart phone, a tablet computer, a set-top box device, a digital video recorder ("DVR") device, a television, a gaming device, a portable media player device, a mobile computing device, and/or any other client-side computing device configured to access digital content on demand from provider subsystem 102 (e.g., through a service provided by provider subsystem 102). While FIG. 1 shows a single content access device 114 within access subsystem 104, this is for illustrative purposes only. Access subsystem 104 may include multiple content access devices 114 associated with user 112 in other embodiments.

In certain examples, an application 116 (e.g., a software application) running on content access device 114 may direct content access device 114 (e.g., by directing a processor of content access device 114) to perform any of the operations of content access device 114 described herein. For example, application 116 may comprise an on-demand media management application configured for use by user 112 to manage on-demand media content, such as by accessing information about content included in library 110 and using the information to initiate one or more operations on the content (e.g., operations such as accessing, storing, and/or presenting the content).

Figure 2:
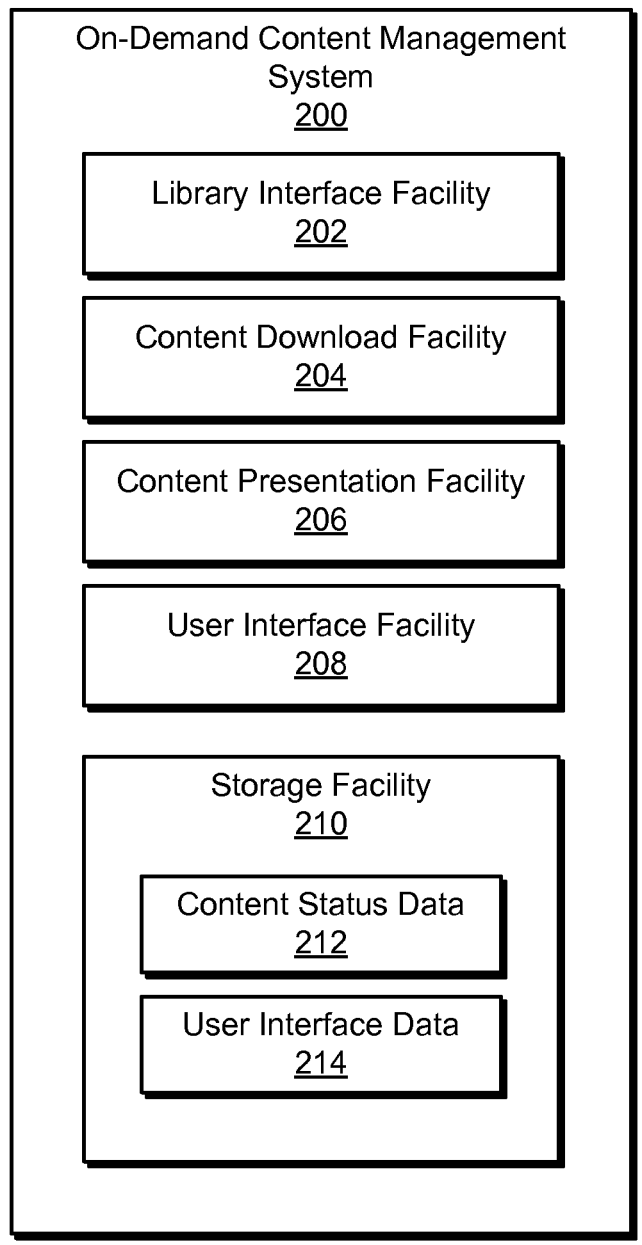
FIG. 2 illustrates an exemplary on-demand content management system according to principles described herein.

FIG. 2 illustrates an exemplary on-demand content management system 200 ("management system 200"). As shown, management system 200 may include, without limitation, a library interface facility 202 ("library facility 202"), a content download facility 204 ("download facility 204"), a content presentation facility 206 ("presentation facility 206"), a user interface facility 208, and a storage facility 210, which may be in communication with one another using any suitable communication technologies. It will be recognized that although facilities 202-210 are shown to be separate facilities in FIG. 2, any of facilities 202-210 may be combined into fewer facilities, such as into a single facility, or divided into more facilities as may serve a particular implementation.

Management system 200 may be implemented by system 100. For example, each of facilities 202-210 may be implemented entirely by access subsystem 104 (e.g., by content access device 114), entirely by provider subsystem 102, or in a distributed implementation across access subsystem 104 and provider subsystem 102. In certain implementations, one or more of facilities 202-210 may be part of application 116 (e.g., components of a client-side content management software application) running on content access device 114. As described herein, management system 200 implemented by system 100 may provide one or more GUI views (e.g., content management views) and/or tools for use by user 112 to find, access, experience, manage, and/or otherwise interact with on-demand content within system 100.

Data generated and/or used by management system 200 may be stored in storage facility 210. For example, storage facility 210 may store content status data 212 representative of statuses of on-demand library content relative to one or more users (e.g., user 112) and user interface data 214 representative of data available for use by user interface facility 208 to generate one or more user interfaces and/or data representative of the generated user interfaces. Additional and/or alternative data may be stored by storage facility 210 in other embodiments.

Library interface facility 202 may be configured to interface with content library 110. For example, library interface facility 202 may access library data such as metadata descriptive of the content included in library 110 from content library 110 and/or may provide update data to content library 110 for use by content library 110 to update library data. To illustrate, in certain embodiments, library data may include data representative of the current status of library content relative to user 112, such as the current status of a content instance included in library 110 relative to user 112. Library interface facility 202 may be configured to access such content status data from content library 110 and/or provide updated content status data to content library 110.

In certain embodiments, a current status of a content instance relative to user 112 may indicate whether the content instance is in an active or inactive download state relative to user 112. A content instance that is in an active download state relative to user 112 may be said to have an active download status, which may include any content download state that is temporally between a receipt of a request from user 112 to download the content instance and a completion of a download of the content instance to the user 112. If the download is a non-persistent download such as a streaming of the content instance, the active download state be referred to as a content streaming state, which may include any content streaming state that is temporally between a receipt of a request from user 112 to begin streaming the content instance and a completion of the streaming of the content instance to the user 112. Examples of active download states include, without limitation, a "waiting-to-download" state indicating that a content access device is waiting (e.g., for completion of another content download and/or other operation) to begin downloading a content instance in response to a user request to download the content instance, a "downloading" state indicating that a content instance is being actively downloaded to a content access device, a "download-paused" state indicating that a download of a content instance has been initiated and is currently paused, a "download-error" state indicating that an error related to a download of a content instance has occurred, a "waiting-to-stream" state indicating that a content access device is waiting to begin streaming a content instance, a "streaming" state indicating that a content instance is being actively streamed to a content access device, a "streaming-paused" state indicating that a streaming of a content instance has been initiated and is currently paused, and a "streaming-error" state indicating that an error related to a streaming of a content instance has occurred.

A content instance that is not in an active download state relative to user 112 may be said to have an inactive download status, which may include any content download state that is not temporally between a receipt of a request from user 112 to download the content instance and a completion of a download of the content instance to the user 112. If the download is a non-persistent download such as a streaming of the content instance, the inactive download state be referred to as an inactive content streaming state, which may include any content streaming state that is not temporally between a receipt of a request from user 112 to begin streaming the content instance and a completion of the streaming of the content instance to the user 112. Examples of inactive download states include, without limitation, an "available-for-download" state, an "already-downloaded" state, an "available-for-streaming" state, and a "streaming-completed" state.

In certain embodiments, a current status of a content instance relative to user 112 may indicate a presentation status of the content instance relative to user 112. For example, a current status may indicate that a content instance is in a "ready-for-presentation" state, a "presenting" state, a "presentation-paused" state, a "presentation-error" state, and/or a "presentation-completed" state.

Content download facility 204 may be configured to perform one or more operations to download on-demand content from provider subsystem 102 to access subsystem 104. For example, content download facility 204 may initiate, execute, and complete a download of a content instance included in library 110 from provider subsystem 102 to access subsystem 104. The download may include any suitable transfer of data representative of the content from provider subsystem 102 to access subsystem 104, including any of the exemplary content transfers described herein.

Content download facility 204 may be configured to maintain data representative of a content download queue. The content download queue may indicate any library content that has an active download status relative to user 112 and/or one or more devices associated with user 112. For example, the content download queue may include data indicating one or more library content instances each having an active download status, which may include any of the exemplary active download states described herein. Download facility 204 may be further configured to provide status update data to library interface facility 202 for use by the library interface facility 202 to interface with library 110 to update the current download status of a content instance included in library 110.

Figure 3:
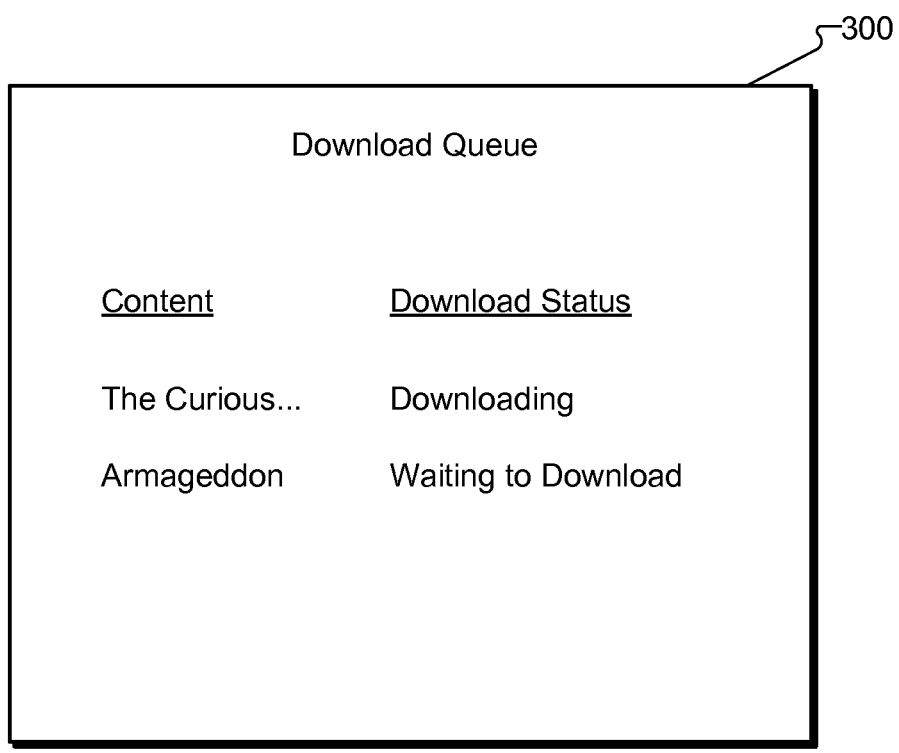
FIG. 3 illustrates an exemplary download queue according to principles described herein.

FIG. 3 illustrates an exemplary download queue 300 that includes data indicating content instances each having an active download status relative to user 112. As shown, download queue 300 may include a list of content instances and a list of current download statuses of the content instances. In the illustrated example, download queue 300 includes data representing a movie titled "The Curious Case of Benjamin Button" "Armageddon" being in a "downloading" state and a movie titled "Armageddon" being in a "waiting to download" state.

Returning to FIG. 2, content presentation facility 206 may be configured to process library content that has been transferred to access subsystem 104. For example, content presentation facility 206 may process downloaded content to present the content for experiencing by user 112. As an example, content presentation facility 206 may be configured to playback a media content instance that has been downloaded to access subsystem 104 (e.g., by playing back a video and/or audio program). Content presentation facility 206 may be further configured to provide status update data to library interface facility 202 for use by the library interface facility 202 to interface with library 110 to update the current presentation status of a content instance included in library 110.

User interface facility 208 may be configured to provide a user interface through which user 112 may find, access, experience, manage, and/or otherwise interact with library content included in library 110 and/or with a service that hosts and provides access to the library content. User interface facility 208 may be configured to provide one or more user interface views and/or tools within the user interface for use by user 112. In certain examples, for example, user interface facility 208 may be configured to generate and display a GUI view within a graphical user interface on a display screen for viewing and/or interaction by user 112. Examples of GUI views that may be provided by user interface facility 208 for display will now be described.

Figure 4:
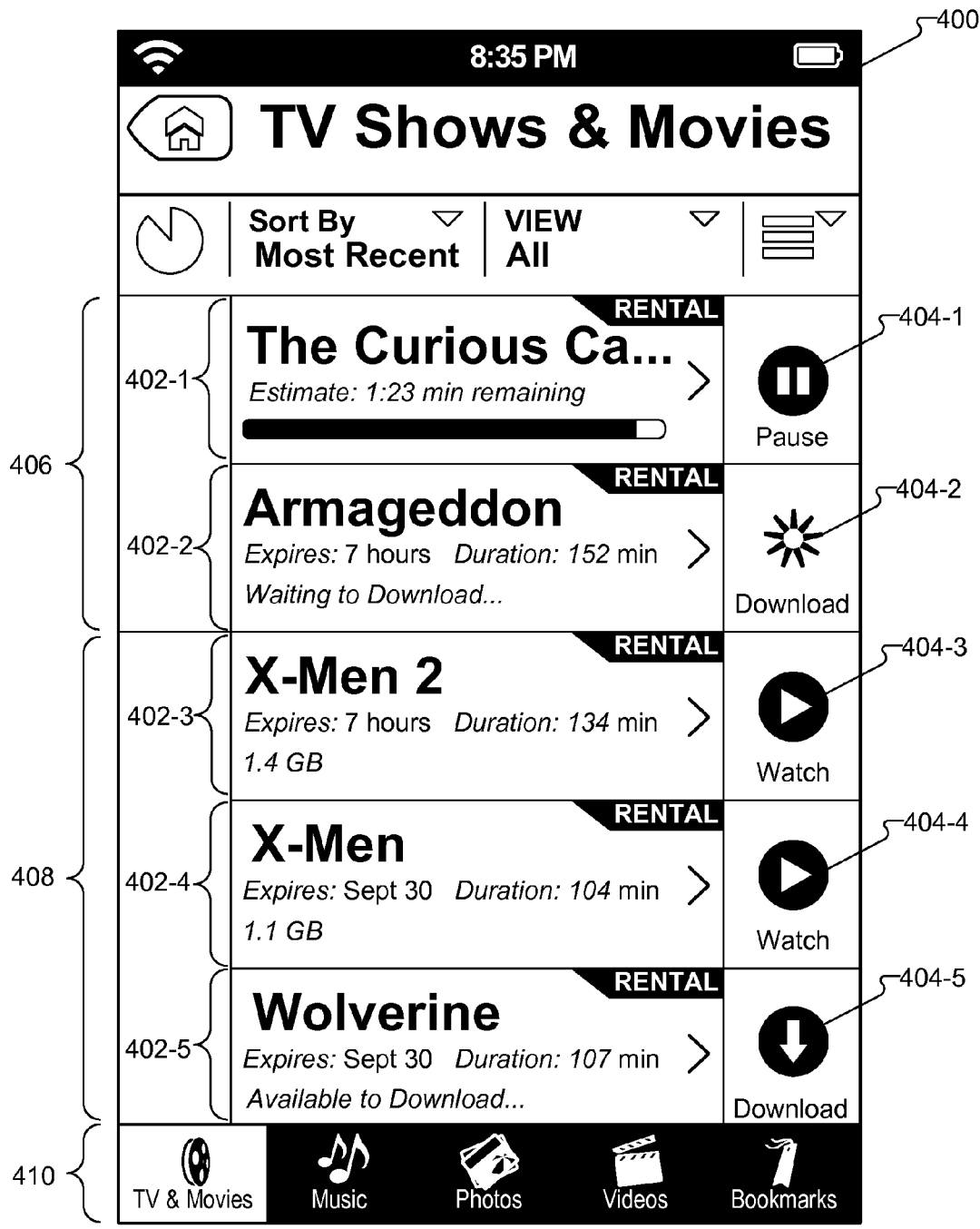
FIGS. 4-14 illustrate exemplary graphical user interface views according to principles described herein.

FIG. 4 illustrates an exemplary GUI view 400 comprising a content library view that includes a list of entries 402 (e.g., entries 402-1 through 402-5) graphically representing a plurality of on-demand content instances included in library 110.

Each entry 402 in the content library view may indicate information about a corresponding content instance represented by the entry 402. To illustrate, entry 402-2 graphically represents a movie titled "Armageddon." Entry 402-2 indicates the title of the movie and additional information related to the movie and/or the status of the movie relative to user 112. For example, entry 402-2 graphically indicates the duration of the movie (e.g., 152 minutes), that the movie is a rental, when a rental of the movie is scheduled to expire (e.g., in seven hours), and the current download status of the movie (e.g., "waiting to download").

Other entries 402 may indicate other statuses of other content instances represented by the other entries 402. For instance, entry 402-1 indicates that a movie titled "The Curious Case of Benjamin Button" is being downloaded (e.g., has a "downloading" state) and has an estimated one minute and twenty-three seconds remaining until the download is complete, and entry 402-5 indicates that a movie titled "Wolverine" is available for download (e.g., has an available-to-download" state) from library 110. Entries 402-3 and 402-4 represent movies titled "X-Men 2" and "X-Men," respectively, and indicate that these movies have been downloaded as rentals and are available for viewing by user 112 until their respective scheduled rental expirations.

The exemplary entries 402 shown in FIG. 4 are illustrative only. Other entries 402 representing other on-demand content instances and/or indicating other information about the content instances may be included in the content library view in other embodiments.

Each entry 402 may include one or more selectable options 404 (e.g., selectable options 404-1 through 404-5) configured to be selected by user 112 to initiate one or more respective operations associated with the on-demand content instance corresponding to the entry 402. To illustrate, entry 402-1 includes selectable option 404-1 configured to be selected by user 112 to pause the download of the movie titled "The Curious Case of Benjamin Button," entry 402-2 includes selectable option 404-2 configured to be selected by user 112 to initiate a download of the movie titled "Armageddon," entry 402-3 includes selectable option 404-3 configured to be selected by user 112 to initiate a playback of the movie titled X-Men 2," entry 402-4 includes selectable option 404-4 configured to be selected by user 112 to initiate a playback of the movie titled X-Men," and entry 402-5 includes selectable option 404-5 configured to be selected by user 112 to request that the movie titled "Wolverine" be downloaded from library 110.

The operations associated with selectable options 404 may be contextually selected and associated with selectable options 404 based on the statuses of the respective on-demand content instances corresponding to entries 402. To illustrate, as shown in FIG. 4, selectable option 404-1 may be associated with an operation to pause a download of a the movie titled "The Curious Case of Benjamin Button" when the current status of the movie is in a downloading state, selectable option 404-2 may be associated with an operation to initiate a download of the movie titled "Armageddon" when the current status of the movie is in a waiting-to-download state, selectable option 404-3 may be associated with an operation to initiate a playback of the movie titled "X-Men 2" when the current status of the movie is in a downloaded and unexpired state, selectable option 404-4 may be associated with an operation to initiate a playback of the movie titled "X-Men" when the current status of the movie is in a downloaded and unexpired state, and selectable option 404-5 may be associated with an operation to request a download of the movie titled "Wolverine" when the current status of the movie is in an available-to-download state. These specific examples are illustrative only. Other operations may be associated with selectable options 404 based on other statuses of the on-demand content instances corresponding to entries 402. An operation associated with a selectable option 404 may be dynamically changed by management system 200 when the status of the on-demand content instance associated with the entry 402 corresponding to the selectable option 404 changes. A graphic representing a selectable option 404 may also be dynamically changed to indicate the changed operation associated with the selectable option 404.

The list of entries 402 displayed in the content library view shown in FIG. 4 may include a first set 406 and a second set 408 of entries 402. That is, the entries 402 in the list may be divided into two different subsets of the entries 402, which subsets may be referred to as the first set 406 and the second set 408 of entries 402. Each subset may include one or more of the entries 402 included in the overall list of entries 402. In the example illustrated in FIG. 4, the first set 406 of entries includes entries 402-1 and 402-2, and the second set 408 of entries includes entries 402-3, 402-4, and 402-5.

The entries included in the first set 406 of entries may represent on-demand content instances included in library 110 and in a download queue associated with user 112. For example, FIG. 4 illustrates the first set 406 of entries to include entries 402-1 and 402-2 representing two movies included in download queue 300. Because the download queue 300 includes data only for content instances that have active download states, as described herein, the first set 406 of entries includes only entries representing content instances that have active download states.

The entries included in the second set 408 of entries may represent on-demand content instances included in library 110 but not in the download queue associated with user 112. For example, FIG. 4 illustrates the second set 408 of entries to include entries 402-3, 402-4, and 402-5 representing three movies included in library 110 but not in download queue 300. Because the download queue 300 includes data only for content instances that have active download states, as described herein, the second set 408 of entries includes only entries representing content instances that have inactive download states.

Thus, as shown in FIG. 4, the illustrated content library view may include data representing a download queue associated with user 112 integrated in the content library view. In particular, data representing the download queue may be integrated within an overall list of entries representing library content. Thus, user 112 is able to view information about both on-demand library content associated with the download queue and on-demand library content not associated with the download queue in a single-page library view, without having to navigate away from the library view to view information about download queue content.

In addition, the content library view may provide information in a consistent manner across the overall list of entries 402. For example, in FIG. 4, the presentation of the entries 402-1 and 402-2 associated with the download queue is consistent with the presentation of the entries 402-3, 402-4, and 402-5 not associated with the download queue. This consistent presentation across the list provides a full and consistent integration of the download queue in the content library view.

The first set 406 of entries 402-1 and 402-2 associated with the download queue may be prioritized by user interface facility 208 over the second set 408 of entries 402-3, 402-4, and 402-5 within the content library view. In the example illustrated in FIG. 4, for instance, the presentation position of the first set 406 of entries is prioritized over the presentation position of the second set 408 of entries within the list. In particular, the first set 406 of entries may be positioned at the top of the overall list of entries 402 such that the download queue information is consistently presented at the top of the overall list of entries 402. In this or a similar manner, library content having an active download status may be prioritized within the content library view.

Additionally or alternatively, user interface facility 208 may be configured to prioritize library content having an active presentation status (e.g., any presentation state indicating that user 112 has initiated but not yet completed a presentation of a content instance). For example, within a content library view, user interface facility 208 may be configured to prioritize library content having an active presentation status after library content having an active download status and before other library content having inactive download and presentation statuses. To illustrate, if the movie titled "X-Men" is determined to have an active presentation status (e.g., the X-Men movie is currently being played back and/or a playback of the X-Men movie is currently paused), user interface facility 208 may prioritize a position of entry 402-4 representing the movie within the content library view compared to positions of entries 402-3 and 402-5 representing other movies determined to have inactive download and presentation statuses. For instance, entry 402-4 may be displayed ahead of entries 402-3 and 402-5 in the content library view, such as is shown in a GUI view 500 illustrated in FIG. 5.

Figure 5:
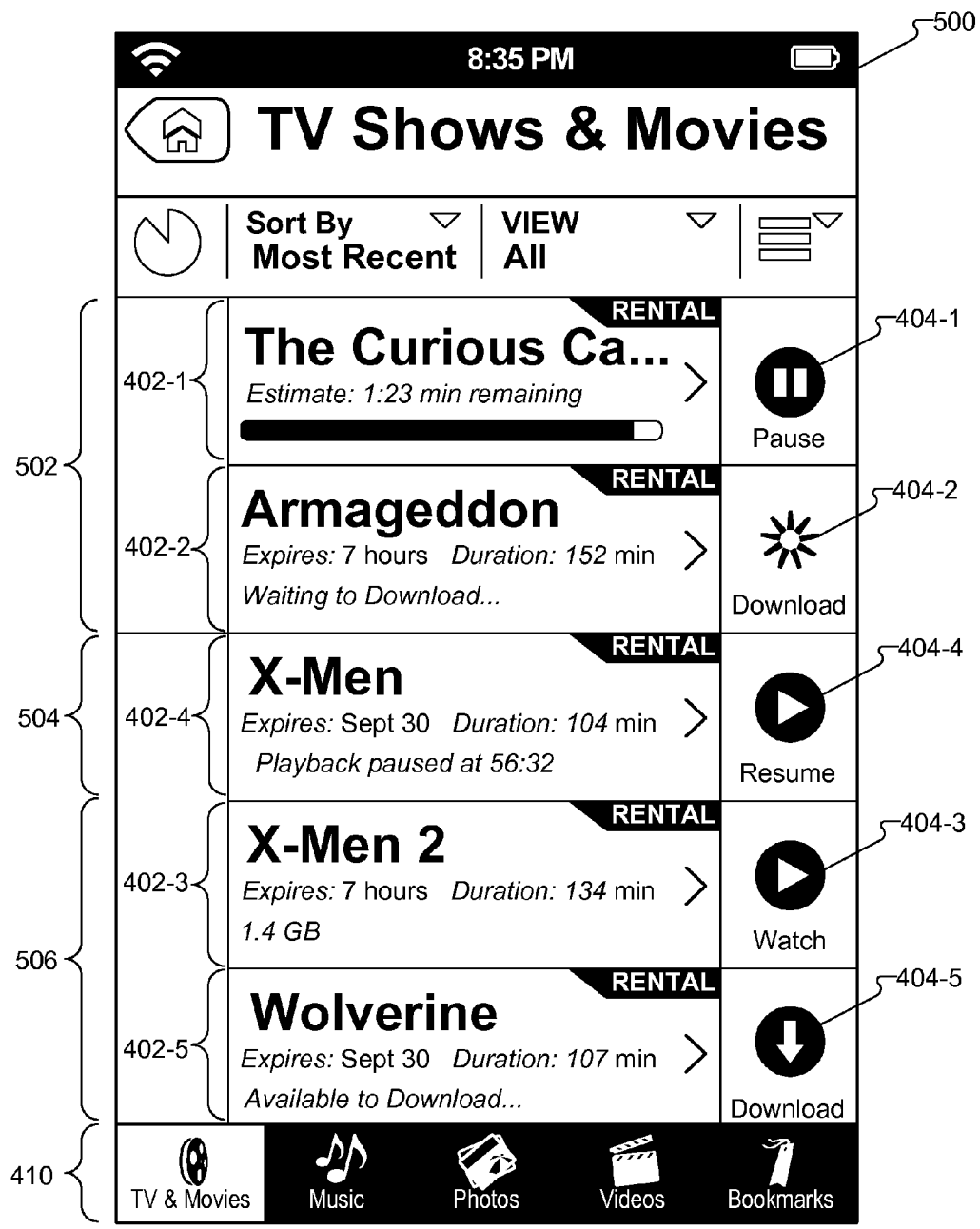

In the example content library view shown in FIG. 5, the overall list of entries 402 may include three different subsets—a first set 502 of one or more entries (e.g., entries 402-1 and 402-2) representing content instances having active download states, a second set 504 of one or more entries (e.g., entry 402-4) representing content instances having inactive download states and active presentations states, and a third set 506 of one or more entries (e.g., entries 402-3 and 402-5) representing content instances having inactive download and presentation states.

User interface facility 208 may be configured to provide a content library view, such as those shown in FIGS. 4 and 5, for display in response to a request for the content library view. For example, user interface facility 208 may receive, from user 112, a user request for a content library view and respond by generating and displaying the content library view in a GUI for viewing and interaction by user 112.

User interface facility 208 may generate the content library view in any suitable way. In certain embodiments, for example, user interface facility 208 may be configured to request and receive data from library interface facility 202, content download facility 204, and/or content presentation facility 206 and to use the data to generate the content library view. To illustrate, in response to a user request for a content library view, user interface facility 208 may interface with content download facility 204 to determine whether a download queue maintained by content download facility 204 includes data indicating any on-demand content instances that have an active download state relative to user 112. If user interface facility 208 determines that the download queue includes data indicating any such on-demand content instances, user interface facility 208 may request, receive, and use information about the content instances and/or the download states of the content instances to integrate data representing the download queue into the content library view. For instance, user interface facility 208 may populate the content library view with one or more entries 402 graphically representing one or more on-demand content instances included in the download queue. To generate the content library view shown in FIG. 4, for example, user interface facility 208 may populate the content library view with entries 402-1 and 402-2 to represent content instances included in the download queue.

In certain embodiments, user interface facility 208 may also interface with content presentation facility 204 to determine whether any content instances included in library 110 have an active presentation status relative to user 112. If user interface facility 208 determines that one or more content instances have an active presentation status relative to user 112, user interface facility 208 may request, receive, and use information about the content instances and/or the presentation states of the content instances to integrate data representing the content instances into the content library view. For instance, user interface facility 208 may populate the content library view with one or more entries 402 graphically representing one or more on-demand content instances having active presentation states. To generate the content library view shown in FIG. 5, for example, user interface facility 208 may populate the content library view with entry 402-4, immediately below entries 402-1 and 402-2 as shown in FIG. 5, to represent the movie titled "X-Men," which has an active presentation state relative to user 112.

In addition to interfacing with content download facility 204 and/or content presentation facility 206, user interface facility 208 may interface with library interface facility 202 to identify one or more other on-demand content instances to represent in the content library view. For example, user interface facility 208 may interface with library interface facility 206 to request, receive, and use information about content instances having inactive download states and/or inactive presentation states to further populate the content library view (e.g., fill the remainder of the content library view) with one or more other entries 402 graphically representing the content instances. To generate the content library view shown in FIG. 4, for example, user interface facility 208 may further populate the content library view with entries 402-3, 402-4, and 402-5, immediately below entries 402-1 and 402-2 as shown in FIG. 4, to represent content instances included in library 110 but not in the download queue. To generate the content library view shown in FIG. 5, for example, user interface facility 208 may further populate the content library view with entries 402-3 and 402-5, immediately below entry 402-4 as shown in FIG. 5, to represent content instances included in library 110 and that have inactive download and presentation states.

The list of entries 402 illustrated in FIGS. 4 and 5 comprises a vertical, linear list of entries 402 in which entries 402 are arranged vertically and linearly within each single-page content library view. As described above, an ordering of entries 402 included in the list may be determined based on the current statuses of the on-demand content instances represented by the entries 402 such that entries 402 representing content instances having active download and/or presentation statuses may be prioritized by ordered placement within the list.

Figure 6:
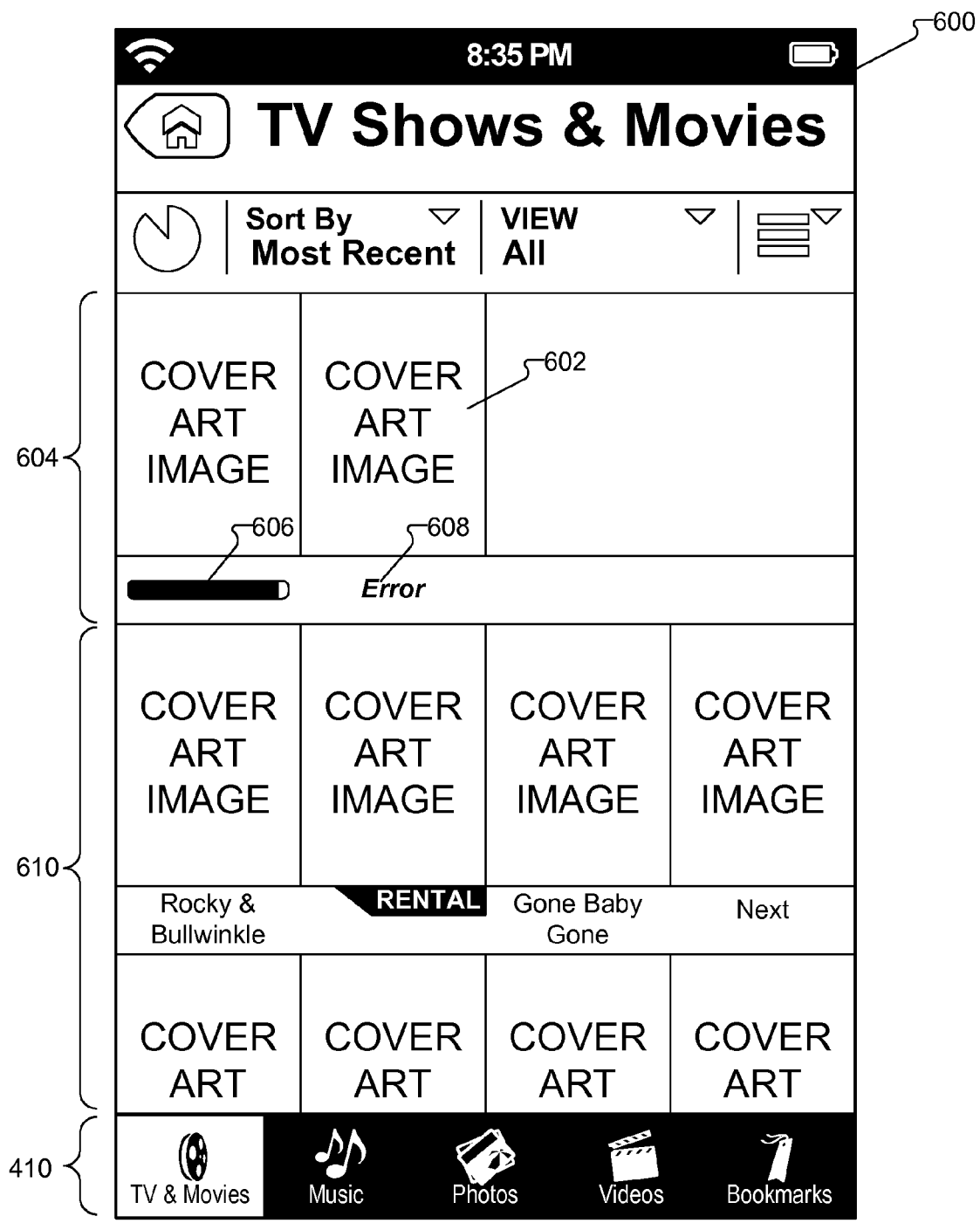

The vertical, linear lists of entries 402 included in the content library views illustrated in FIGS. 4 and 5 are illustrative only. Other graphical arrangements of entries representing on-demand content instances may be used in other examples of content library views that have a download queue integrated therein. For example, FIG. 6 illustrates an exemplary GUI view 600 comprising a content library grid view. As shown in FIG. 6, the content library view may include entries representing on-demand content instances arranged in a two-dimensional grid within a GUI. Each entry may comprise a thumbnail image displaying a cover art image representative of the content instance associated with the entry. For example, entry 602 comprises a rectangular-shaped thumbnail image displaying a cover art image representative of an on-demand content instance.

The entries in the grid view may be divided into different groups of entries based on the statuses of the content instances represented by the entries. For example, the entries may include a first set 604 of one or more entries representing one or more content instances included in a download queue (e.g., content instances each having an active download status relative to user 112). In the example illustrated in FIG. 6, the first set 604 of entries includes two entries each having an active download status.

The grid view may graphically indicate a download state of each content instance represented by the entries included in the first set 604 of entries. For example, the grid view may include a graphic 606 indicating the progress of a download of a first content instance represented by a first entry included in the first set 604 of entries and a graphic 608 indicating an error associated with a download of a second content instance represented by a second entry (e.g., entry 602) included in the first set 604 of entries.

The entries in the grid view may further include a second set 610 of one or more entries representing one or more content instances included in library 110 but not in the download queue associated with user 112 (e.g., content instances each having an inactive download status relative to user 112). The grid view may further include graphics indicating information about the content instances represented by the entries in the second set 610 of entries. For example, below each thumbnail image entry, a graphic indicating a title, type, and/or other information about the corresponding content instance may be displayed.

User interface facility 208 may be configured to prioritize the first set 604 of entries over the second set 610 of entries in the content library grid view. In the example illustrated in FIG. 6, for instance, if at least one content instance has an active download status relative to user 112, user interface facility 208 may allocate the top row of the grid for the display of entries included in the first set 604 of entries. User interface facility 208 may populate the first row of the grid with the first set 604 of entries. If additional screen space is needed, one or more additional rows of the grid may be allocated for the display of entries included in the first set 604 of entries. After allocating and populating one or more rows of the grid view with the first set 604 of entries representing the download queue, user interface facility 208 may allocate one or more additional rows positioned below the row(s) allocated for the download queue for the display of the second set 610 of entries, such as is shown in FIG. 6.

In certain examples, user interface facility 208 may be configured to provide a GUI view and/or one or more tools (e.g., selectable options) within a GUI view for use by user 112 to select to toggle views between a content library grid view (e.g., the grid view shown in FIG. 6) and a content library list view (e.g., the list view shown in FIG. 4).

User interface facility 208 may be configured to generate a content library view that includes entries representing various types of on-demand content. Additionally or alternatively, user interface facility 208 may be configured to generate a content library view that is specific to a select type of on-demand content. To illustrate, each of the content library views illustrated in FIGS. 4-6 is specific to a particular type classification of on-demand content, namely on-demand content in the form of television shows and movies. Each of the content library views illustrated in FIGS. 4-6 is specific to a particular type classification of on-demand content in another way—each entry represents rental type on-demand content.

Referring again to FIG. 4, GUI view 400 includes a menu 410 of selectable content type options. In FIG. 4, a "TV & Movies" option is selected. Accordingly, the content library view illustrated in FIG. 4 is specific to content that includes television shows and movies. That is, the content library view illustrated in FIG. 4 includes only entries 402 that represent television shows and/or movies.

Content library views similar to those illustrated in FIGS. 4-6 may be generated by user interface facility 208 for other select type classifications of content. For instance, a content library view similar to the content library view shown in FIG. 4 may be generated and displayed in response to a user selection of another option included in menu 410, such as a "Music" option, a "Photos" option, a "Videos" option, and a "Bookmarks" option. As an example, in response to a user selection of the "Music" option, user interface facility 208 may generate and display a content library view similar to the content library view shown in FIG. 4 but including entries representing only music-type content instances (e.g., songs). As another example, in response to a user selection of the "Bookmarks" option, user interface facility 208 may generate and display a content library view similar to the content library view shown in FIG. 4 but including entries representing only content instances that have been bookmarked by user 112 (e.g., as being of interest to user 112).

In certain examples, content instances may be automatically bookmarked by management system 200 and/or bookmarked in response to manual user input requesting that content be bookmarked. As an example, a content instance that has been purchased but not yet downloaded by user 112 may be automatically bookmarked such that data representing the content instance will be included in a bookmark GUI view and a content library specific to the same type of content as the content instance. When a download of the content instance is requested by user 112, management system 200 may automatically remove the bookmark and add data representing the content instance to the download queue associated with user 112.

The exemplary options shown in menu 410 in FIG. 4 are illustrative only. Additional and/or alternative options may be included in menu 410 in other embodiments. For example, options associated with commercial, purchase, rental, subscription, and/or personal type content may be included for selection by user 112 to launch a display of a content library view specific to the selected type of content. To illustrate, GUI view 400 comprises a content library view that is specific to rental type on-demand content. User interface facility 208 may be configured to display a similar content library view that is specific to purchase type on-demand content or subscription type on-demand content (e.g., content that is available to user 112 at no extra charge based on a subscription that user 112 has).

User interface facility 208 may be configured to generate and display additional and/or alternative GUI views, which may include additional and/or alternative content library views and/or other views related to content library views. To illustrate, FIGS. 7-14 show examples of GUI views that may be generated and displayed by user interface facility 208. These GUI views, as well as relationships that these GUI views have with one or more of the GUI views 400-600 shown in FIGS. 4-6 will now be described.

Figure 7:
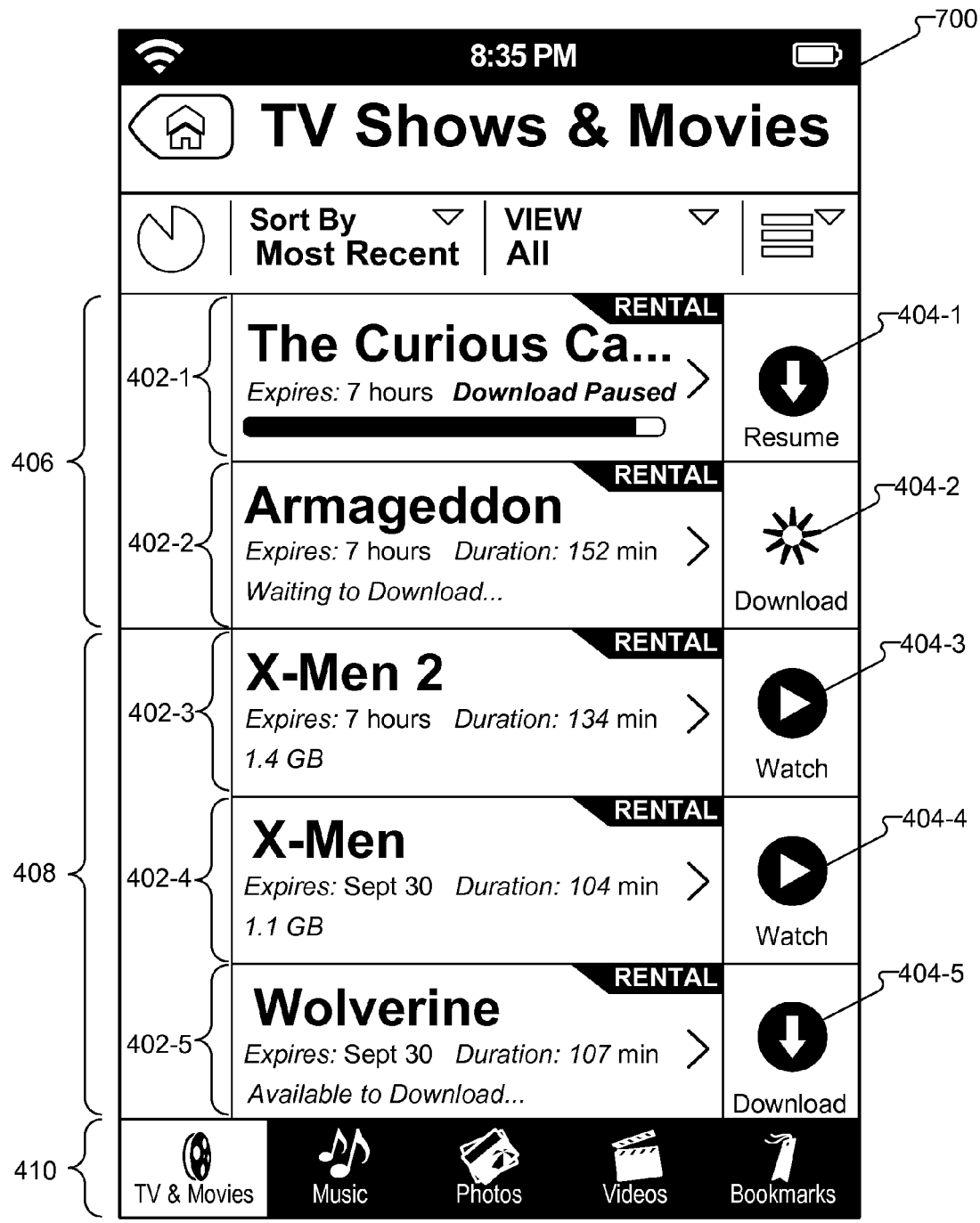

Turning again to FIG. 4, in response to a user selection of option 404-1 in the content library view shown in FIG. 4, user interface facility 208 may display a GUI view 700 comprising an updated content library view shown in FIG. 7. To illustrate, in response to a user selection of option 404-1, a download of the movie titled "The Curious Case of Benjamin Button" may be paused and the active download status of the movie changed to a download-paused state. Based on these changes, user interface facility 208 may update the content library view shown in FIG. 4 to become the content library view shown in FIG. 7, which view reflects the change in the status of the movie. As shown in FIG. 7, entry 402-1 has been updated to reflect that the download of the movie titled "The Curious Case of Benjamin Button" is paused. The graphic representing selectable option 404-1 has also been updated to indicate an association with an operation to resume the paused download.

If the download of the movie titled "The Curious Case of Benjamin Button" fails, the active download state of the movie may be updated to a download-error state. Because the download of the movie failed, content download facility 204 may automatically begin downloading the next content instance included in the download queue. For example, content download facility 204 may automatically initiate a download of the movie titled "Armageddon" and change the active download status of the "Armageddon" movie from a waiting-to-download state to a downloading state.

Figure 8:
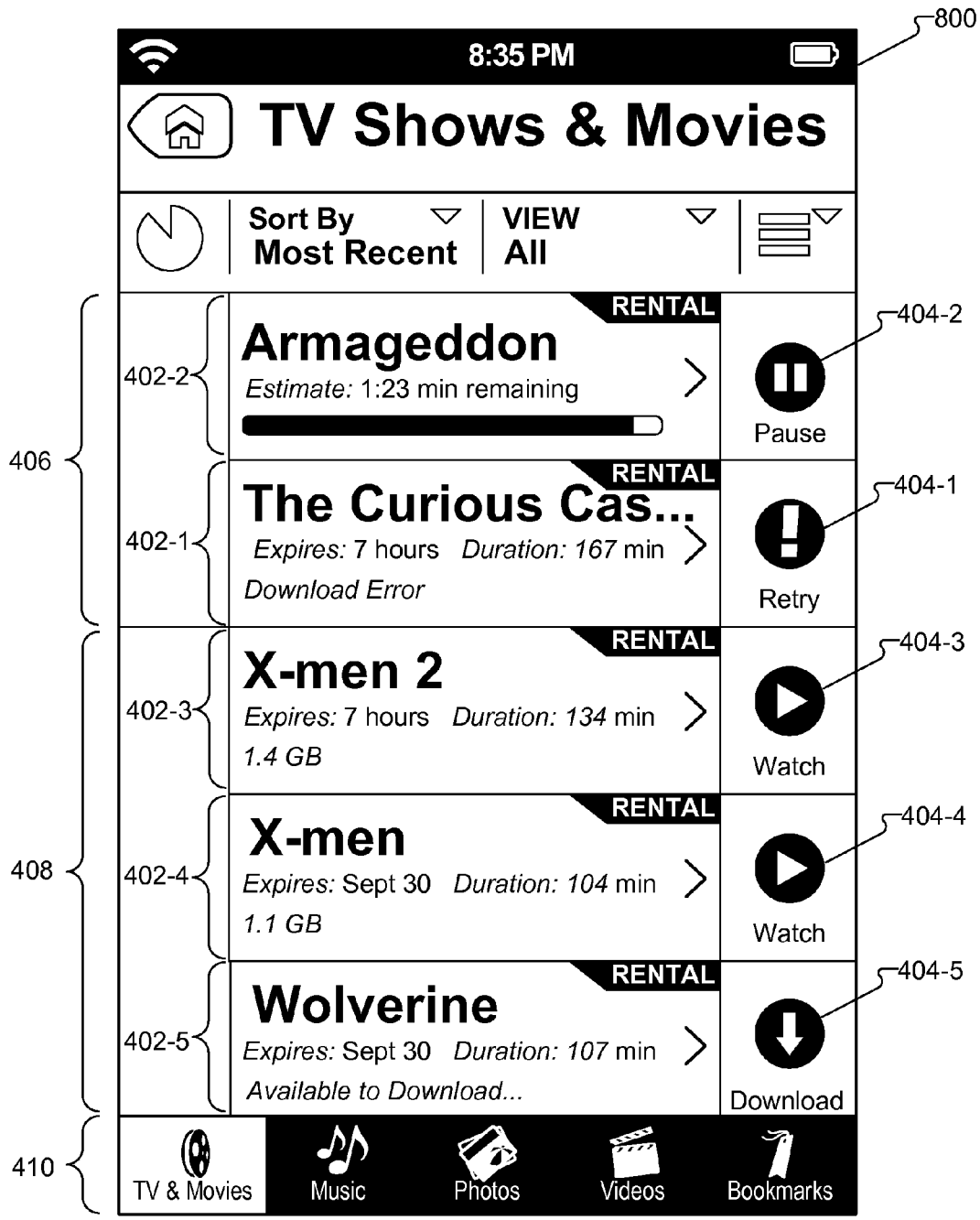

User interface facility 208 may be configured to automatically update the content library view shown in FIG. 4 or FIG. 7 to reflect these changes in download status. To illustrate, FIG. 8 shows a GUI view 800 comprising an updated content library view, which reflects the changes in the statuses of the movies titled "The Curious Case of Benjamin Button" and "Armageddon." As shown, the update may include re-ordering the entries 402-1 and 402-2 representing the respective movies such that entry 402-2 is now displayed above entry 402-1 in the list of entries 402 to reflect that the "Armageddon" movie is currently downloading and thus prioritized before "The Curious Case of Benjamin Button" movie that is in a download-error state. Graphics representing selectable options 404-1 and 404-2 are also updated to indicate associations with operations to retry the download of "The Curious Case of Benjamin Button" movie and to pause the download of the "Armageddon" movie, respectively.

Figure 9:
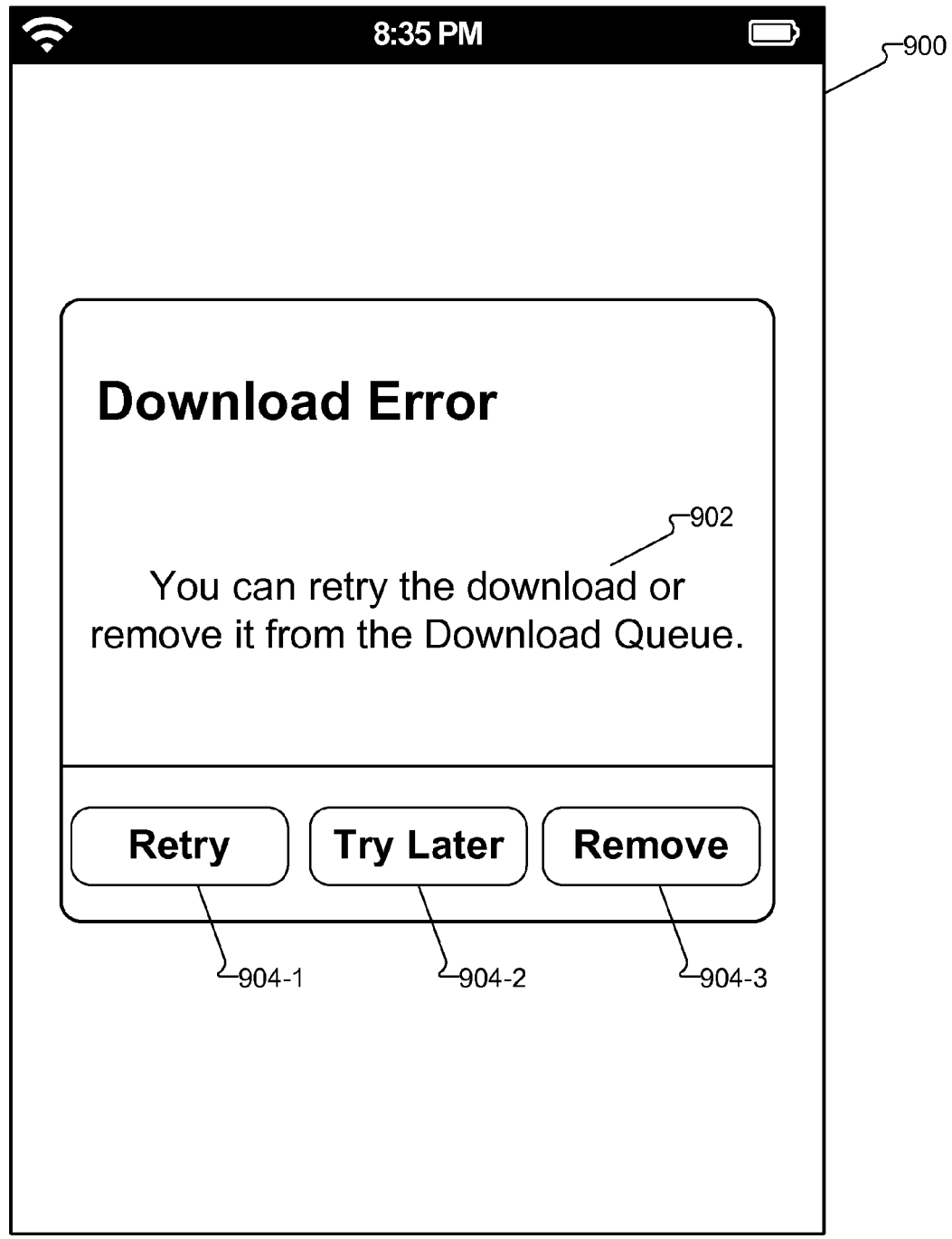

If the user 112 selects entry 404-1 in FIG. 8, user interface facility 208 may respond by displaying a GUI view to provide user 112 with one or more selectable options related to the download error associated with "The Curious Case of Benjamin Button" movie represented by entry 402-1. For example, FIG. 9 illustrates an exemplary GUI view 900 that includes a message 902 about the download error and selectable options 904 configured (e.g., 904-1 through 904-3) to be selected by user 112 to indicate whether user 112 prefers to retry the download, try the download later, or remove the movie from the download queue.

Referring again to FIG. 4, in response to a user selection of option 404-2 in GUI view 400, content download facility 204 may initiate a download of the "Armageddon" movie. In certain examples, to initiate the download of the "Armageddon" movie, content download facility 204 may pause any other active download, such as the download of "The Curious Case of Benjamin Button" movie. Content download facility 204 may change the download states of the movies to reflect that "The Curious Case of Benjamin Button" movie is now in a download-paused state and that the "Armageddon" movie is now in a downloading state.

Figure 10:
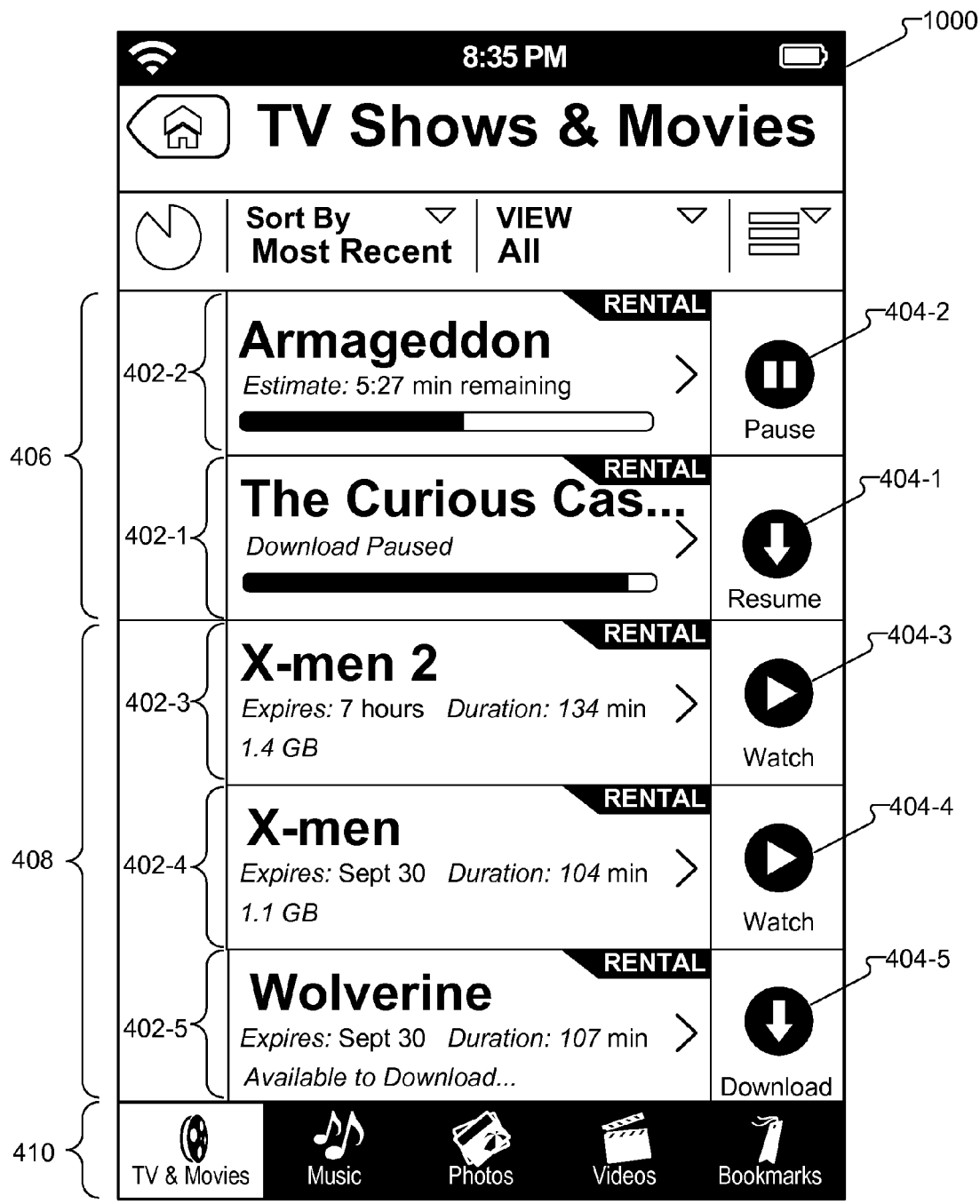

User interface facility 208 may be configured to automatically update the content library view shown in FIG. 4 to reflect these changes in download status. To illustrate, FIG. 10 shows a GUI view 1000 comprising an updated content library view, which reflects the changes in the statuses of the movies titled "The Curious Case of Benjamin Button" and "Armageddon." As shown, the update may include re-ordering the entries 402-1 and 402-2 representing the respective movies such that entry 402-2 is now displayed above entry 402-1 in the list of entries 402 to reflect that the "Armageddon" movie is currently downloading and thus prioritized before "The Curious Case of Benjamin Button" movie that is in a download-paused state. Graphics representing selectable options 404-1 and 404-2 are also updated to indicate associations with operations to resume the download of "The Curious Case of Benjamin Button" movie and to pause the download of the "Armageddon" movie, respectively.

Figure 11:
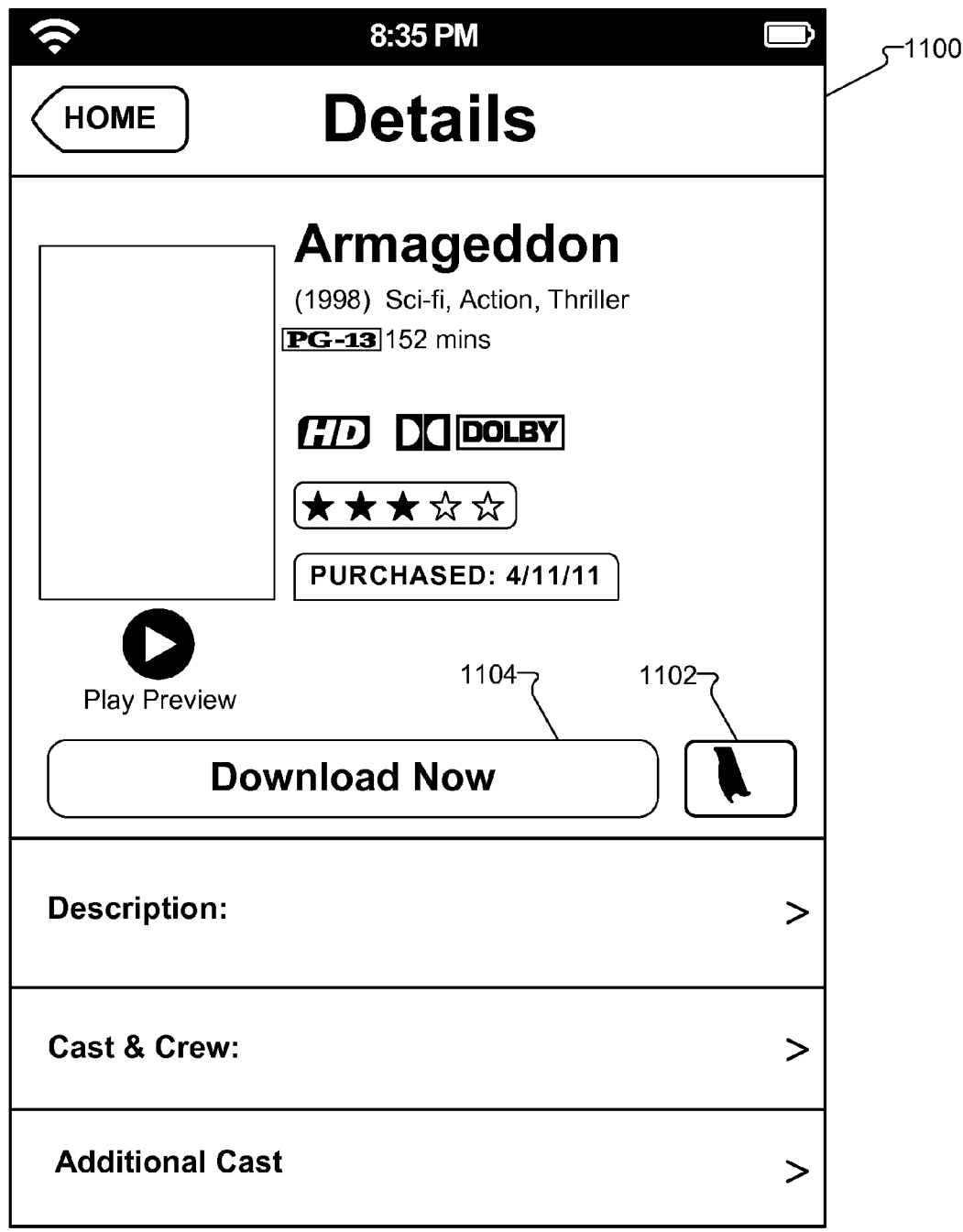

User interface facility 204 may be configured to generate and display detail views within a GUI. As used herein, a "detail view" is specific to a single on-demand content instance and typically provides detailed information and/or access to additional detailed information about the content instance. For example, FIG. 11 illustrates an exemplary GUI view 1100 comprising a detail view specific to the "Armageddon" movie. As shown, the detail view may provide detailed information and/or access to additional detailed information about the "Armageddon" movie.

The detail view may also include selectable options configured to be selected by user 112 to initiate execution of operations associated with the selectable options. For example, the detail view illustrated in FIG. 11 includes a selectable option 1102 configured to be selected by user 112 to "bookmark" the "Armageddon" movie. The detail view also includes a selectable option 1104 configured to be selected by user 112 to request that the "Armageddon" movie be downloaded.

Figure 12:
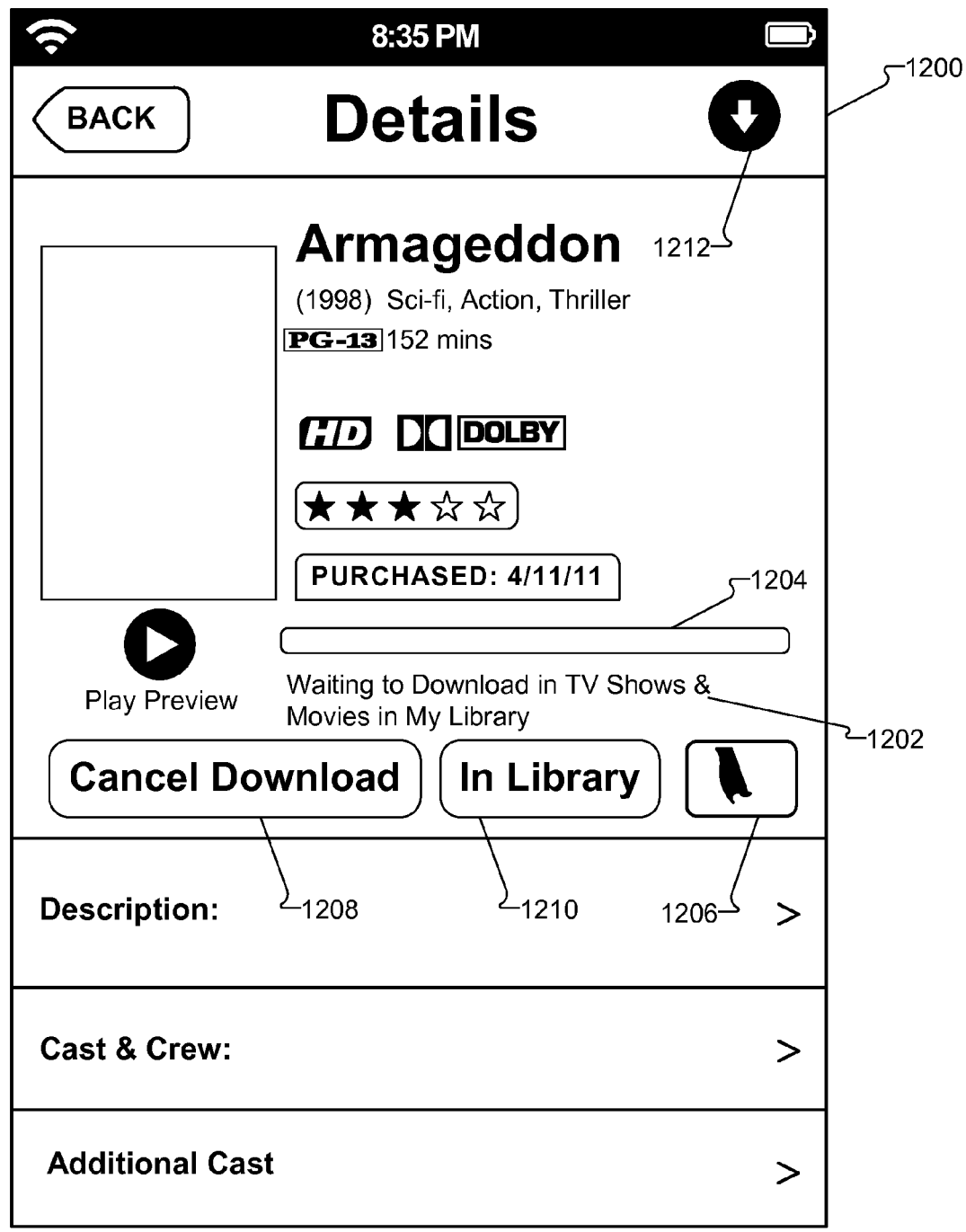

In response to a user selection of option 1104, content download facility 204 may add data representative of the "Armageddon" movie to a download queue associated with user 112. The status of the "Armageddon" movie in library 110 may be changed to a waiting-to-download state relative to user 112 (when another content instance is already currently downloading). User interface facility 208 may update the detail view to reflect these changes. To illustrate, FIG. 12 shows a GUI view 1200 comprising the detail view updated to reflect these changes. As shown, the detail view includes a graphic 1202 indicating that the "Armageddon" movie is in a waiting-to-download state. Graphic 1204 further indicates the progress of a download of the movie, and shows that no progress has been made because the movie is in the waiting-to-download state.

The detail view illustrated in FIG. 12 may also include selectable options configured to be selected by user 112 to initiate execution of operations associated with the selectable options. The selectable options included in the detail view may be updated based on the current download status of the "Armageddon" movie. For example, the detail view illustrated in FIG. 12 includes a selectable option 1206 configured to be selected by user 112 to "bookmark" the "Armageddon" movie. The detail view also includes a selectable option 1208 configured to be selected by user 112 to request that the requested download of the "Armageddon" movie be canceled. The detail view further includes a selectable option 1210 configured to be selected by user 112 to request that a content library view associated with the "Armageddon" movie be displayed.

In response to a user selection of option 1210 in GUI view 1200, user interface facility 208 may generate and display a content library view, such as described herein. For example, interface facility 208 may generate and display the content library view shown in FIG. 4. Thus, option 1210 in the detail view shown in FIG. 12 may function as a link to a content library view that is associated with the content instance represented in the detail view. For instance, option 1210 in GUI view 1200 may function as a link to a content library view that is specific to the same type of content (e.g., television shows and movies type content) as the content instance represented in the detail view. In certain embodiments, another selectable option 1212 included in the detail view shown in FIG. 12 may also be configured to function as a link to content library view that is associated with the content instance represented in the detail view.

Figure 13:
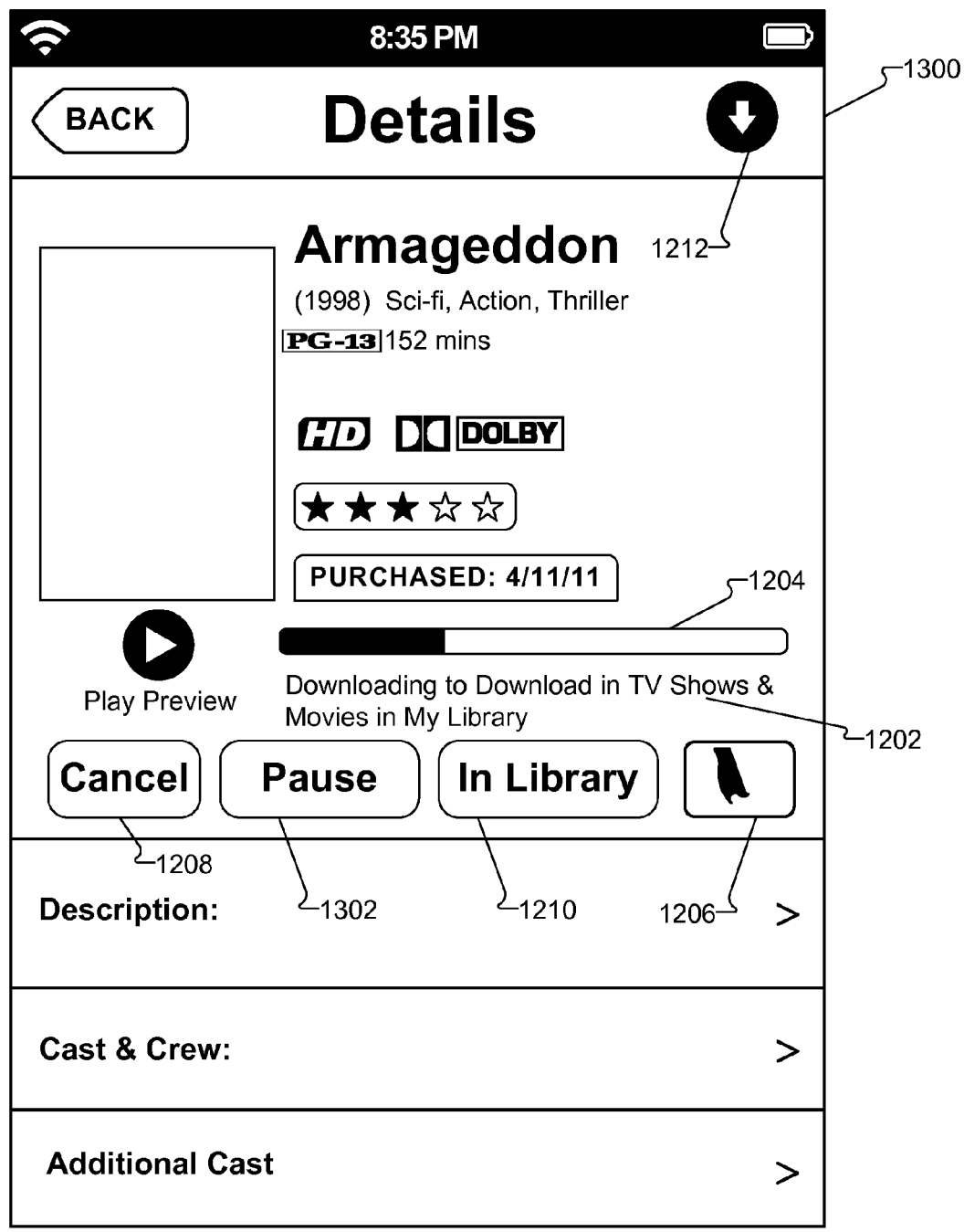

If, while GUI view 1200 is displayed, the "Armageddon" movie begins to download, content download facility 204 will change the active download status of the movie to be in a downloading state relative to user 112. User interface facility 208 may update the detail view to reflect this change. To illustrate, FIG. 13 shows a GUI view 1300 comprising the detail view updated to reflect this change. As shown, graphic 1202 has been updated to indicate that the "Armageddon" movie is in a downloading state. Graphic 1204 has also been updated to indicate the progress of the download of the movie.

In addition, the selectable options included in the detail view have been updated based on the downloading state of the movie. As shown in FIG. 13, the detail view still includes selectable options 1206, 1208, and 1210, which may be selected by user 112 to "bookmark" the movie, cancel the download of the movie, and request that a content library view associated with the movie be displayed, respectively. The detail view in FIG. 13 further includes a selectable option 1302 configured to be selected by user 112 to pause the download of the movie.

In response to a user selection of option 1210 in GUI view 1300, user interface facility 208 may generate and display a content library view, such as described herein. For example, interface facility 208 may generate and display the content library view shown in FIG. 10. Thus, option 1210 in the detail view shown in FIG. 13 may continue to function as a link to a content library view that is associated with the content instance represented in the detail view. GUI view 1300 may also include selectable option 1212, which may also continue to function as a link to content library view that is associated with the content instance represented in the detail view.

If, while GUI view 1300 is displayed, the download of the "Armageddon" movie completes, content download facility 204 will change the download status of the movie to be in an already-downloaded state relative to user 112. Accordingly, the movie no longer has an active download status and is removed from the download queue. The movie may be added to a content library specific to user 112, which may be referred to as "my library."

Figure 14:
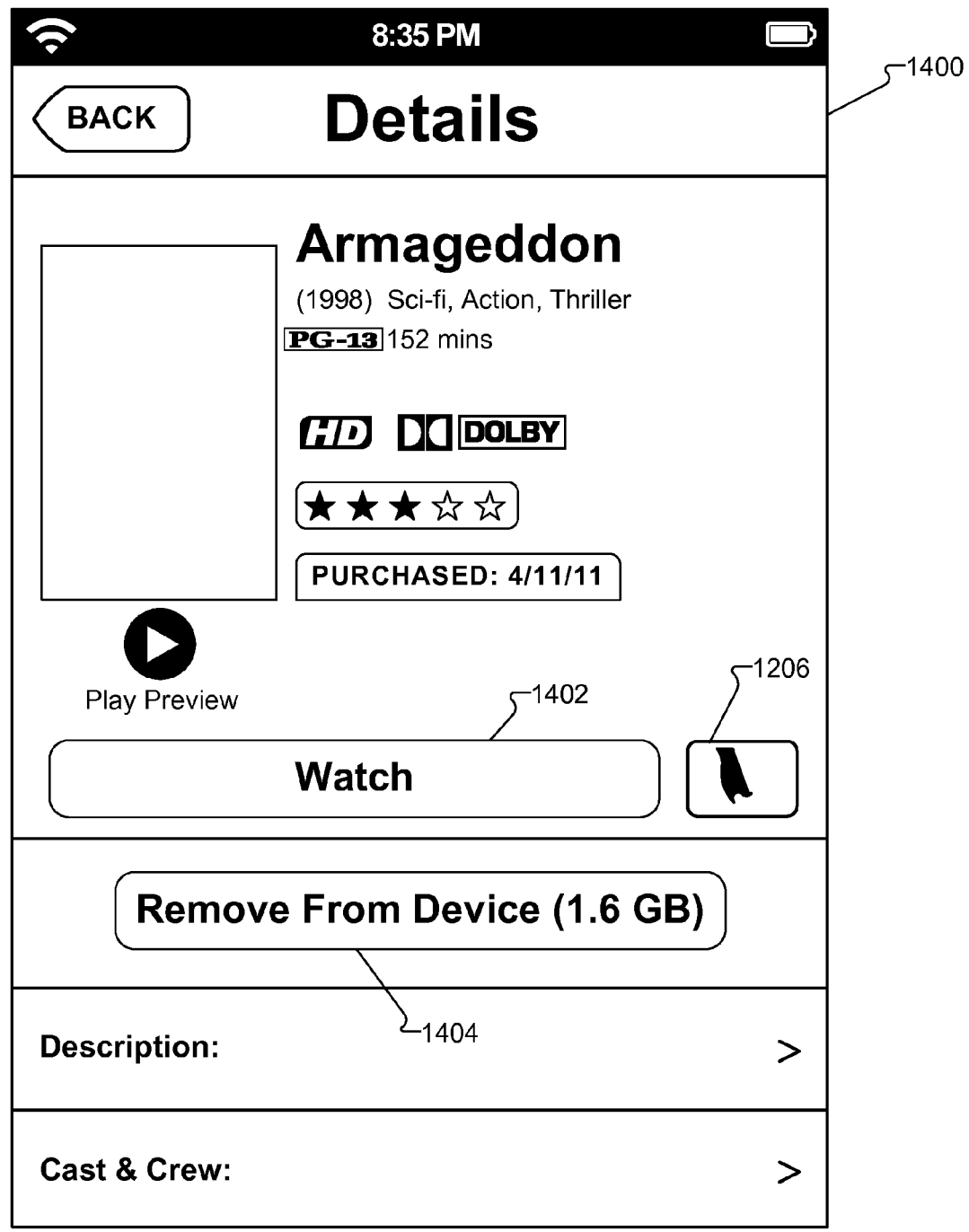

User interface facility 208 may update the detail view to reflect the completed download. To illustrate, FIG. 14 shows a GUI view 1400 comprising the detail view updated to reflect the completed download. As shown, selectable options in the detail view have been updated to include selectable option 1206 configured to be selected by user 112 to "bookmark" the movie, a selectable option 1402 configured to be selected by user 112 to initiate a playback of the movie, and a selectable option 1404 configured to be selected by user 112 to remove the downloaded movie from the content access device to which the movie was downloaded.

In certain embodiments, library interface facility 202 and/or user interface facility 208 shown in FIG. 2 may be configured to maintain a status data field and a value for the status data field for each media content instance associated with content library 110. The value in the single data field may represent multiple different statuses of the media content instance and may be referred to as an "aggregate status value." To generate the aggregate status value of the data field, library interface facility 202 and/or user interface facility 208 may aggregate data representing multiple different statuses of the media content instance acquired from one or more sources to produce the aggregate status value, which is represented in the data field in a manner that allows user interface facility 208 to utilize the aggregate status value to determine the multiple different individual statuses.

To illustrate, system 200 may maintain download status data, presentation status data, purchase status data, and bookmark status data for a media content instance. The data indicating these statuses may be maintained by and/or for different components of system 200. For example, library interface facility 202 may maintain purchase status data indicating whether the media content instance has been purchased by a user and bookmark status data indicating whether the media content instance has been bookmarked by the user. Content download facility 204 may maintain download status data for the media content instance, and content presentation facility 206 may maintain presentation status data for the media content instance. Library interface facility 202 and/or user interface facility 208 may be configured to retrieve the various status data for the media content instance, aggregate it to generate an aggregate status value for the media content instance, and store the aggregate status value in the status data field.

Once the aggregate status value is stored in the status data field, it is available for use by user interface facility 208 to generate a user interface view such as any of the exemplary GUI views described herein. For example, user interface facility 208, in response to a request for such a GUI view, may access the aggregate status value in the data field and use the aggregate status value to determine multiple statuses of a media content instance, such as download, presentation, bookmark, and/or purchase statuses of a media content instance. User interface facility 208 may use these statuses determined from a single status data field value to selectively populate the GUI view based on the statuses. Accordingly, in a single GUI view, information and/or options about various statuses of a media content instance may be presented.

The use of an aggregate status value in a status data field may allow a GUI view to include robust information and/or options related to multiples statuses of a media content instance, without having to retrieve such data from multiple sources on the fly (e.g., from multiple databases, data tables, applications, etc.), which would undesirably increase the time required to render the GUI view.

Figure 15:
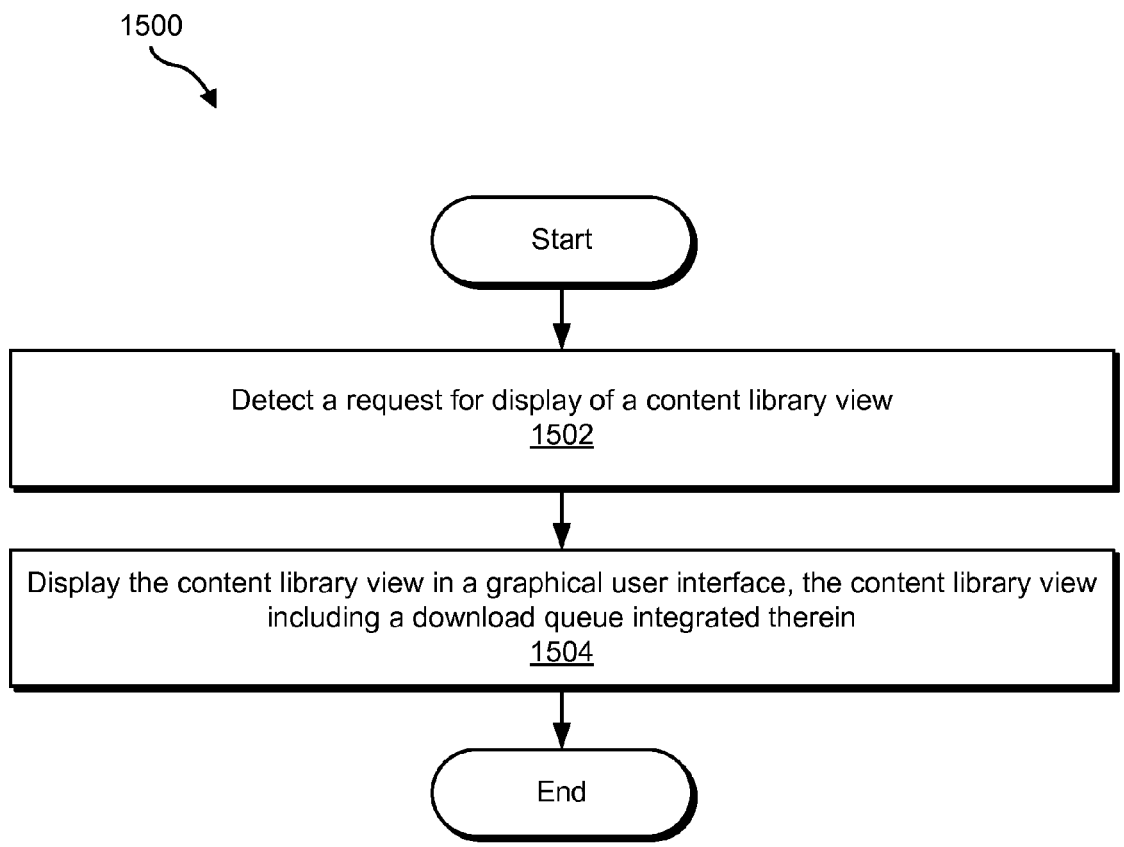
FIGS. 15-16 illustrate exemplary on-demand content management methods according to principles described herein.
Figure 16:
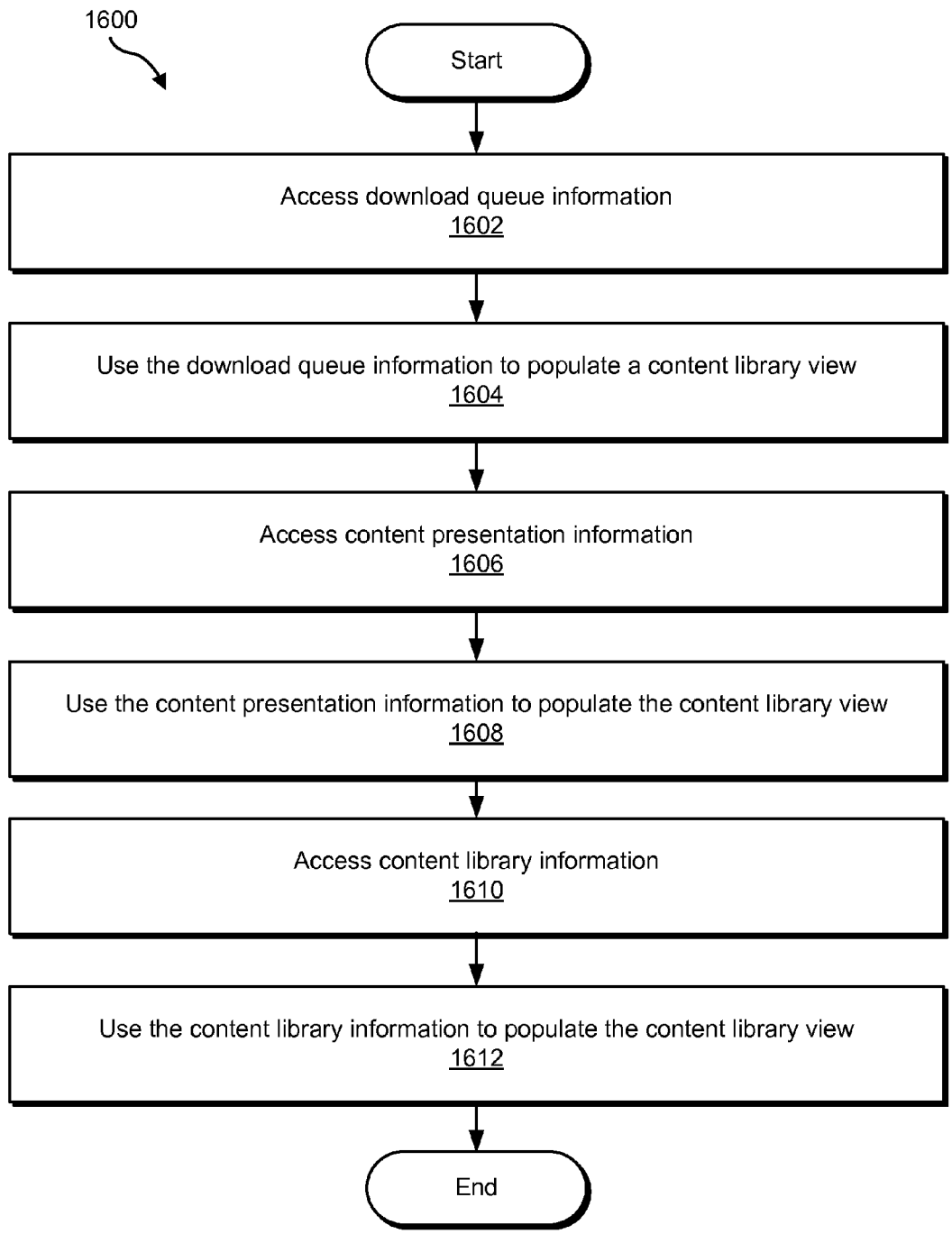

FIGS. 15-16 illustrate exemplary on-demand content management methods 1500-1600. While FIGS. 15-16 illustrate exemplary steps according to one embodiment, other embodiments may omit, add to, reorder, combine, and/or modify any of the steps shown in FIGS. 15-16. One or more of the steps shown in FIG. 15-16 may be performed by system 100, management system 200, and/or one or more components thereof.

Turning to FIG. 15, in step 1502, a user request for display of a content library view is detected. Step 1502 may be performed in any of the ways described herein. In certain embodiments, for example, user interface facility 208 of management subsystem 200 may receive the user request.

In step 1504, the content library view is displayed in a GUI in response to the request. A download queue may be integrated within the content library view in any of the ways described herein. Step 1504 may be performed in any of the ways described herein. In certain embodiments, for example, user interface facility 208 of management subsystem 200 may generate and provide the content library view for display in any of the ways described herein, including by performing one or more steps of method 1600 illustrated in FIG. 16.

In step 1602 of method 1600, user interface facility 208 may access download queue information. For example, user interface facility 208 may query content download facility 204 for download queue information, such as described herein. If the download queue information indicates that a content download queue includes data representing one or more on-demand content instances having an active download status, user interface facility 208 may use download queue information obtained in step 1602 to populate a content library view in step 1604, such as by populating the content library view with one or more entries representing one or more on-demand content instances included in the content download queue, as described herein.

In step 1606, user interface facility 208 may access content presentation information. For example, user interface facility 208 may query content presentation facility 206 for content presentation information, such as described herein. If the content presentation information indicates that one or more on-demand content instances have an active presentation status, user interface facility 208 may use content presentation information obtained in step 1606 to populate the content library view in step 1608, such as by populating the content library view with one or more entries representing one or more on-demand content instances having an active presentation status, as described herein.

In step 1610, user interface facility 208 may access content library information. For example, user interface facility may query content library interface facility 202 for content library information, such as described herein. In step 1612, user interface facility 208 may use content library information obtained in step 1610 to populate the content library view, such as by populating the content library view with one or more entries representing one or more on-demand content instances that are included in a library of hosted, on-demand content and that have inactive content download and presentation states, as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 17:
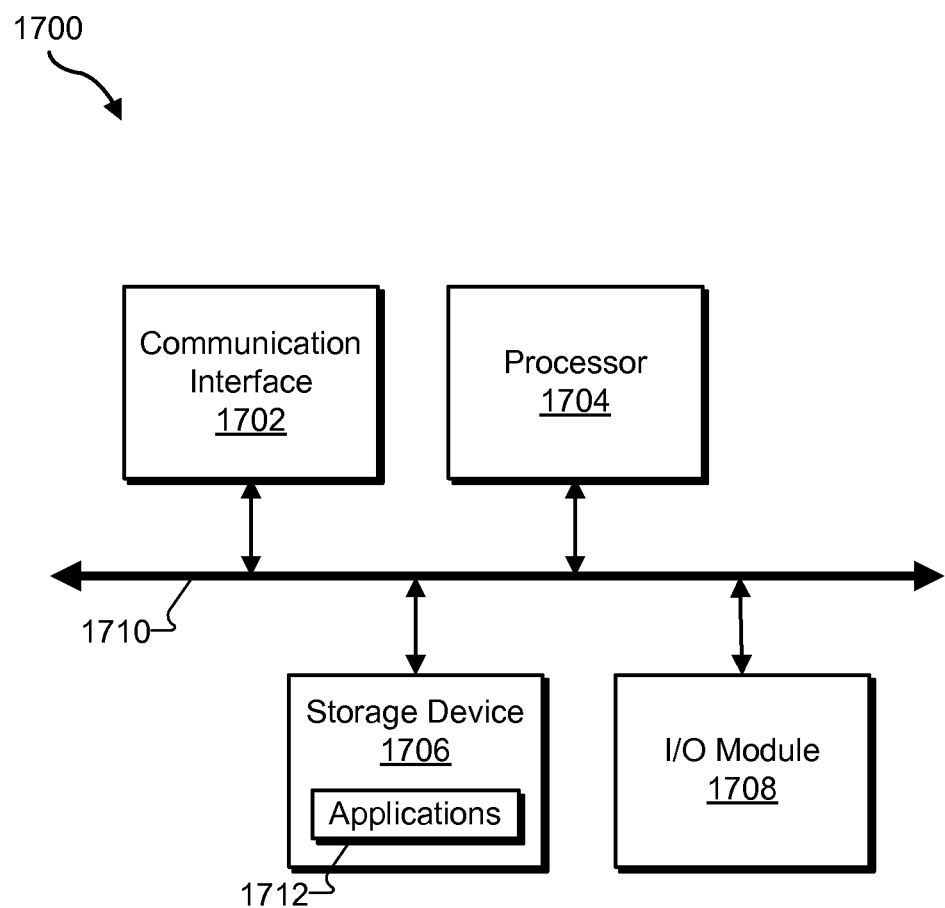
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may execute and/or direct execution of operations as directed by one or more applications 1712 (which may include one or more software applications 102 included in suite 100) or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the systems and/or system components described herein may be implemented by or within one or more components of computing device 1700. For example, one or more applications 1712 residing within storage device 1706 may be configured to direct processor 1704 to perform one or more processes or functions associated with library interface facility 202, content download facility 204, content presentation facility 206, and/or user interface facility 208. Likewise, storage facility 210 may be implemented by or within storage device 1706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by an on-demand content management system, a user request for a content library view; and
    displaying, by the on-demand content management system in response to the request, the content library view in a graphical user interface, the content library view including a list of entries graphically representing a plurality of on-demand content instances included in a library of on-demand content, the list of entries comprising:
        a first set of one or more entries representing one or more on-demand content instances included in the library and in a download queue, the one or more on-demand content instances represented by the first set of one or more entries each having an active download state, the active download state indicating a download state that is temporally between a receipt of a download request and a completion of a download responsive to the download request, a second set of one or more entries representing one or more other on-demand content instances included in the library but that do not have the active download state, and a third set of one or more entries representing one or more other on-demand content instances having an active presentation status that indicates a presentation state in which a user has initiated a presentation of an on-demand content instance but the presentation has not yet completed, wherein a position of the first set of one or more entries is prioritized over a position of the second set of one or more entries in the list of entries and over a position of the third set of one or more entries in the list of entries, and wherein the position of the third set of one or more entries is prioritized below the position of the first set of one or more entries and over the position of the second set of one or more entries in the content library view provided for display in the graphical user interface.

2. The method of claim 1, wherein the first set of one or more entries is positioned at the top of the list of entries in the content library view.

3. The method of claim 1, wherein the second set of one or more entries is positioned below the first set of one or more entries and below the third set of one or more entries in the content library view.

4. The method of claim 1, wherein an entry in the list of entries includes a selectable option configured to be selected by a user to initiate an operation associated with an on-demand content instance represented by the entry.

5. The method of claim 4, wherein the operation is contextually based on a current status of the on-demand content instance represented by the entry.

6. The method of claim 1, wherein the download state comprises a content streaming state.

7. The method of claim 1, wherein the one or more other on-demand content instances represented by the second set of one or more entries each have an inactive download state and an inactive presentation state.

8. The method of claim 7, wherein:
the inactive download state for a first on-demand content instance included in the one or more other on-demand content instances represented by the second set of one or more entries comprises an available-to-download state; and
the inactive download state for a second on-demand content instance included in the one or more other on-demand content instances represented by the second set of one or more entries comprises an already-downloaded state.

9. The method of claim 1, wherein the plurality of on-demand content instances represented by the list of entries in the content library view comprise a plurality of on-demand media content instances.

10. The method of claim 9, wherein:
the plurality of media content instances represented by the list of entries in the content library view are all associated with a common media content type classification; and the content library view is specific to the common media content type classification.

11. The method of claim 1, wherein the library of on-demand content comprises one of a commercial library of hosted, on-demand content and a personal library of hosted, on-demand content.

12. The method of claim 1, wherein the displaying comprises generating and providing the content library view for display, the generating comprising:
accessing download queue information;
using the download queue information to populate the content library view with the first set of one or more entries representing one or more on-demand content instances included in the library and in the download queue;
accessing content library information; and
using the content library information to populate the content library view with the second set of one or more entries representing one or more other on-demand content instances included in the library but that do not have the active download state and that are not in the download queue.

13. The method of claim 1, further comprising:
generating, by the on-demand content management system, an aggregate status value for an on-demand content instance included in the library of on-demand content, the aggregate status value representing multiple statuses of the on-demand content instance; and
maintaining, by the on-demand content management system, the aggregate status value in a status data field;
wherein the displaying comprises using the aggregate status value in the status data field to generate and provide the content library view for display.

14. The method of claim 1, embodied as computer-executable instructions on at least one non-transitory computer-readable medium.

15. A method comprising:
detecting, by an on-demand content management system, a user request for a content library view;
accessing, by the on-demand content management system, download queue information associated with a content download queue;
using the download queue information to populate the content library view with a first set of one or more entries representing one or more on-demand content instances included in a library of on-demand content and in the content download queue, the one or more on-demand content instances represented by the first set of one or more entries each having an active download state, the active download state indicating a download state that is temporally between a receipt of a download request and a completion of a download responsive to the download request;
accessing, by the on-demand content management system, content library information;
using, by the on-demand content management system, the content library information to populate the content library view with a second set of one or more entries representing one or more other on-demand content instances included in the library of on-demand content but that do not have the active download state;
accessing, by the on-demand content management system, content presentation information; and
using, by the on-demand content management system, the content presentation information to populate the content library view with a third set of one or more entries representing one or more other on-demand content instances having an active presentation status, the active presentation status indicating a presentation state in which a user has initiated a presentation of an on-demand content instance but the presentation has not yet completed; and providing, by the on-demand content management system, the content library view for display in a graphical user interface on a display screen, wherein a position of the first set of one or more entries is prioritized over a position of the second set of one or more entries and over a position of the third set of one or more entries in the content library view, and wherein the position of the third set of one or more entries is prioritized below the position of the first set of one or more entries and over the position of the second set of one or more entries in the content library view provided for display in the graphical user interface.

16. The method of claim 15, embodied as computer-executable instructions on at least one non-transitory computer-readable medium.

17. A system comprising:

an on-demand content service provider subsystem that hosts a library of on-demand content; and a user interface facility that is implemented by at least one of the on-demand content service provider subsystem and a content access device communicatively coupled to the on-demand content service provider subsystem, that accesses the on-demand content included in the library, and that:

detects a user request for display of a content library view, and generates and provides the content library view to the content access device for display, the content library view including a list of entries graphically representing a plurality of on-demand content instances included in the library of on-demand content, the list of entries comprising:

a first set of one or more entries representing one or more on-demand content instances included in the library and in a download queue, the one or more on-demand content instances represented by the first set of one or more entries each having an active download state, the active download state indicating a download state that is temporally between a receipt of a download request and a completion of a download responsive to the download request, a second set of one or more entries representing one or more other on-demand content instances included in the library but that do not have the active download state, and a third set of one or more entries representing one or more other on-demand content instances having an active presentation status that indicates a presentation state in which a user has initiated a presentation of an on-demand content instance but the presentation has not yet completed, wherein a position of the first set of one or more entries is prioritized over a position of the second set of one or more entries in the list of entries and over a position of the third set of one or more entries, and wherein the position of the third set of one or more entries is prioritized below the position of the first set of one or more entries and over the position of the second set of one or more entries in the content library view provided for display in the graphical user interface.

18. The system of claim 17, wherein the first set of one or more entries is positioned at the top of the list of entries in the content library view.

19. The system of claim 17, wherein the second set of one or more entries is positioned below the first set of one or more entries and below the third set of one or more entries in the content library view.

* * * * *